Feb. 12, 1963 T. A. ROZSA ETAL 3,077,308
PROCESS OF REDUCING AND SURFACE TREATING CEREAL ENDOSPERM
PARTICLES AND PRODUCTION OF NEW PRODUCTS
THROUGH ATTENDANT SEPARATIONS
Filed March 14, 1956 6 Sheets-Sheet 1

INVENTORS
TIBOR A. ROZSA
REZSOE GRACZA
ARLIN B. WARD
BY
Williamson, Schroeder, Adams, & Meyers
ATTORNEYS

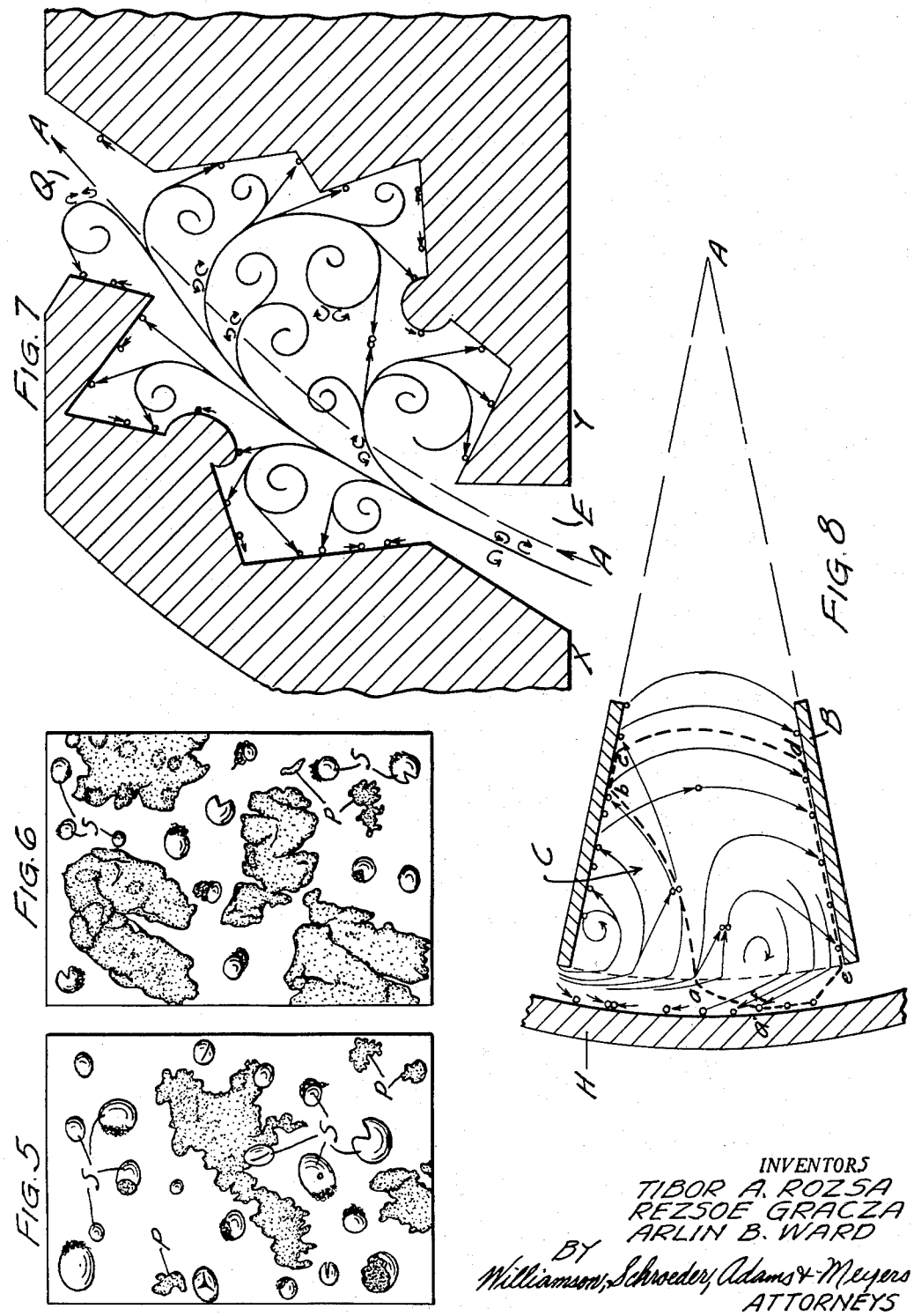

Feb. 12, 1963 T. A. ROZSA ETAL 3,077,308
PROCESS OF REDUCING AND SURFACE TREATING CEREAL ENDOSPERM
PARTICLES AND PRODUCTION OF NEW PRODUCTS
THROUGH ATTENDANT SEPARATIONS
Filed March 14, 1956 6 Sheets-Sheet 3
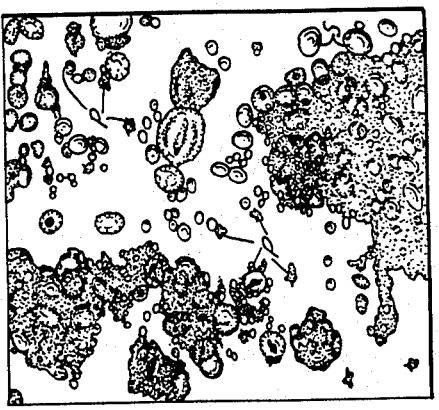
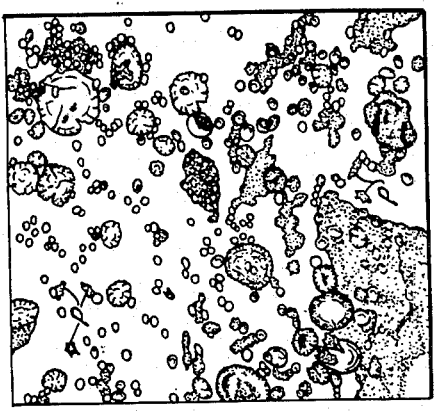
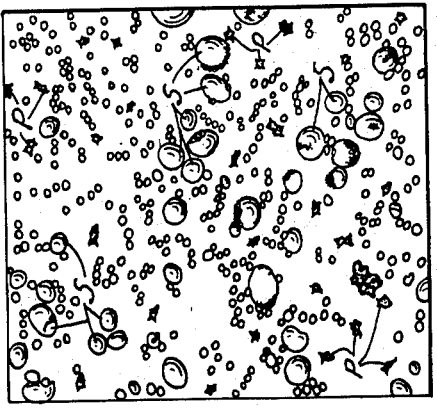
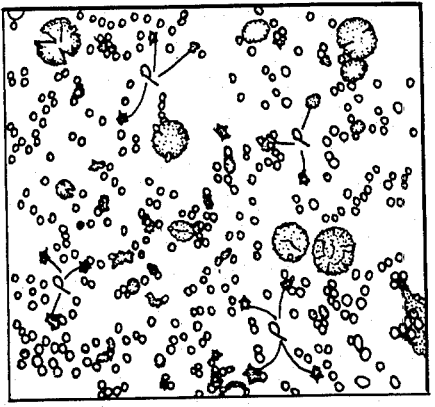
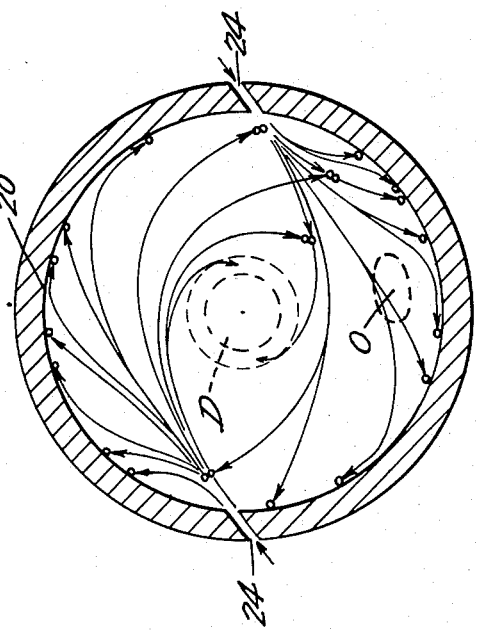
INVENTORS
TIBOR A. ROZSA
REZSOE GRACZA
ARLIN B. WARD
BY
Williamson, Schroeder, Adams, & Meyers
ATTORNEYS

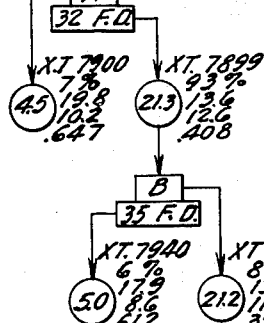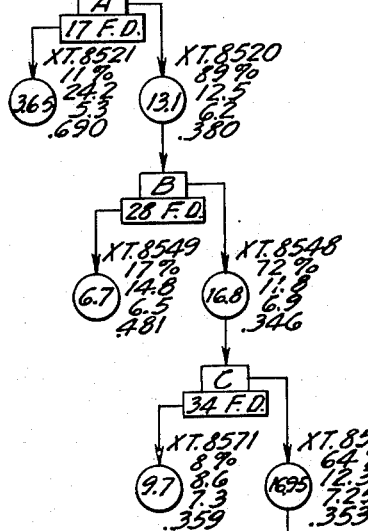

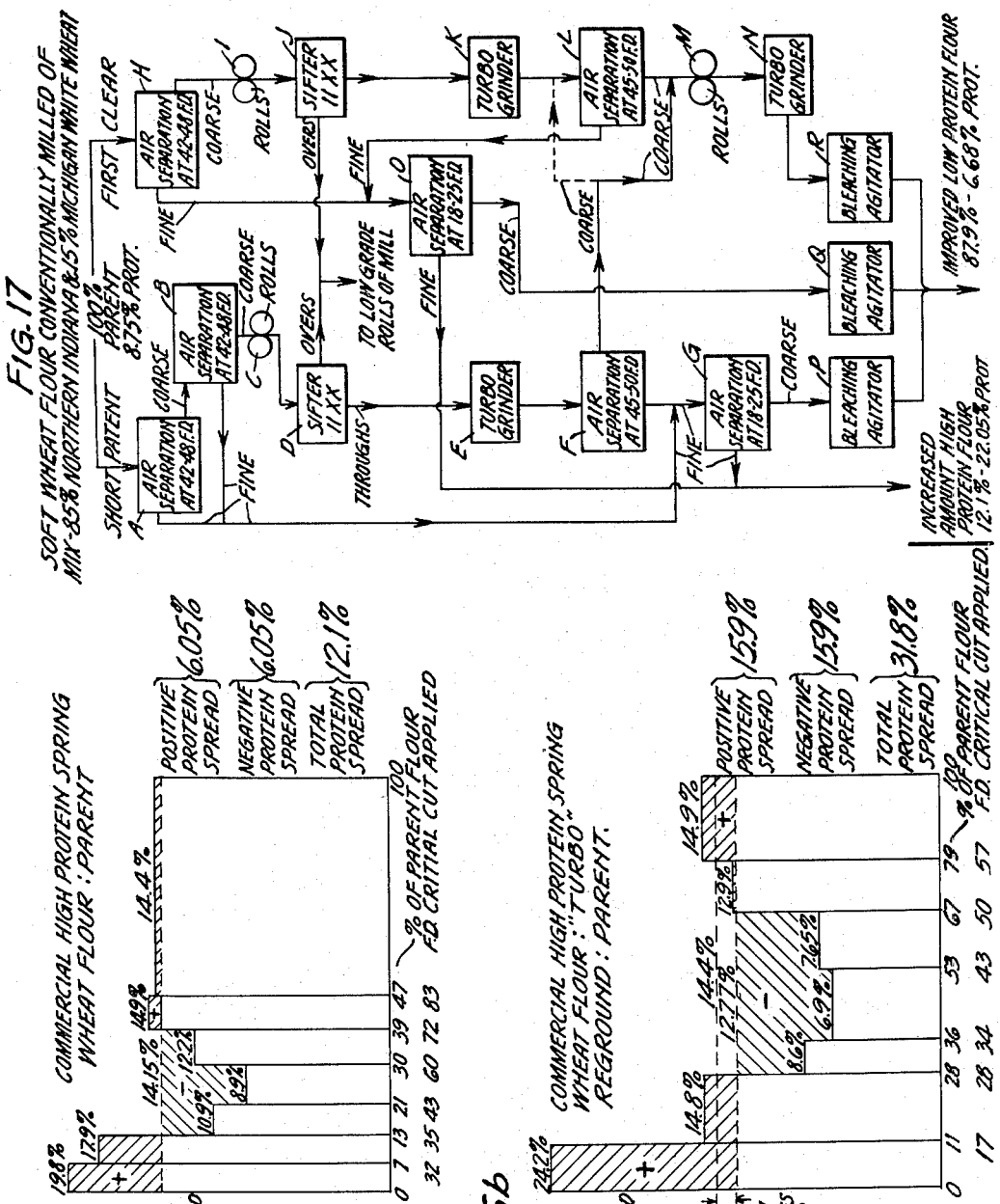

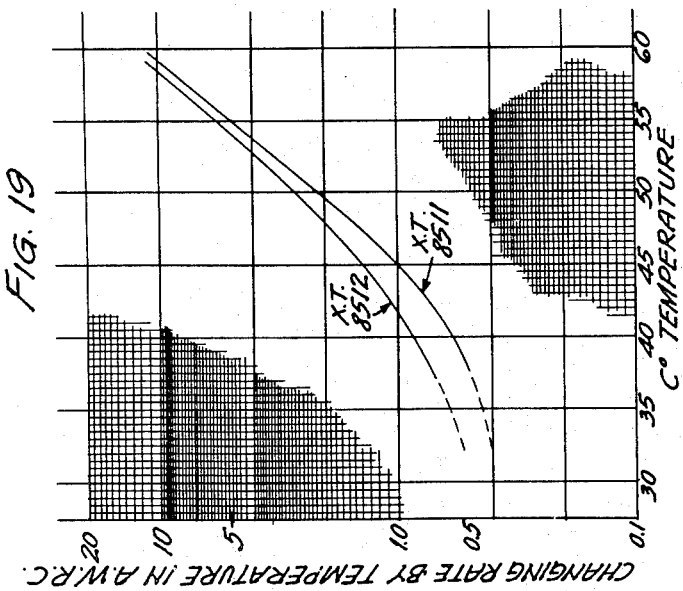
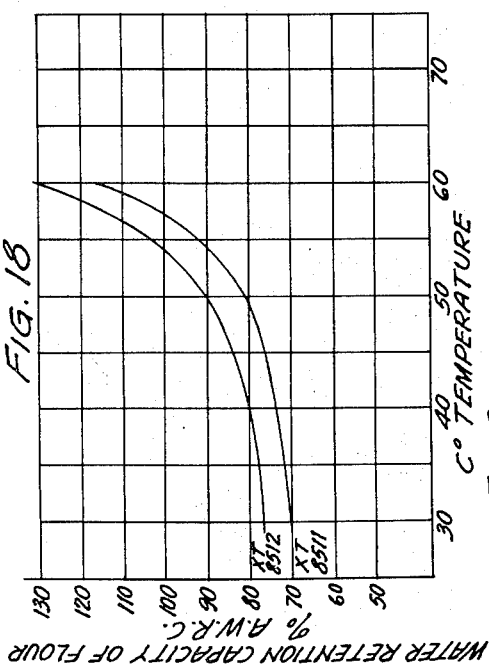
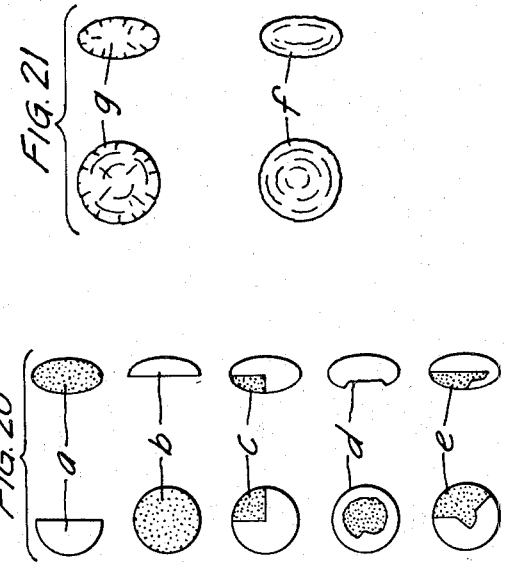

United States Patent Office 3,077,308
Patented Feb. 12, 1963

3,077,308
PROCESS OF REDUCING AND SURFACE TREATING CEREAL ENDOSPERM PARTICLES AND PRODUCTION OF NEW PRODUCTS THROUGH ATTENDANT SEPARATIONS
Tibor A. Rozsa, Minneapolis, Minn., Arlin B. Ward, Springfield, Ill., and Rezsoe Gracza, Minneapolis, Minn., assignors to The Pillsbury Company, a corporation of Delaware
Filed Mar. 14, 1956, Ser. No. 571,477
6 Claims. (Cl. 241—11)

This invention relates to the reduction or comminution, and to the dry-surface dressing and treatment, of the endosperm fragments of cereal flour stocks to change and enhance the properties thereof for commercial use. The endosperm fragments or particles are treated in accordance with our processes after the outer layers, hull, bran, aleurone, and most of the germ have been removed from the natural grain.

The instant application and the discoveries set forth herein, in several respects, have relation to the processes and inventions disclosed in copending application, Serial Number 470,244 which was assigned to our assignee, Pillsbury Mills Co.

At the present time, break and reduction grinding of cereal grains are almost universally accomplished through roller mills with, in some instances, fling-impact machines being employed in one or more stages. Roller mills produce disintegration of the stock fed therethrough mainly through application of crushing pressure and shearing forces. Impact grinders split or fracture the whole grain or grain particles by intense impact forces producing splits along lines of least resistance or natural cleavage. In both types of grinding, the particles of the flour produced differ tremendously in shape and size, ranging from about two microns to two hundred microns in greatest length. There are also differences in the density of the various particles produced. While roller mills are adequate to produce flour in the 50 to 150 micron particle size range, they are entirely inadequate to produce, through close setting of the rolls, reground, very fine particle size flours having the specific surface area, the viscosity and hydration properties desired. Fine regrinding by commercial roller mills produces excessive heat and necessarily results in the shattering and bursting or bodily damaging of the starch granules, and change of protein properties, and also produces flaky stock which will sift only with difficulty.

Natural cereal grains such as soft and hard wheat, barley, corn and rye are heterogeneous, containing many layers of branny, cellulose and aleurone material which surround the endosperm portions. The endosperm portions themselves are heterogeneous, containing in each grain or berry thousands of endosperm cells, each of which is made up of an amorphous matrix of protein material wherein are embedded many whole starch granules disposed in closely spaced relation and varying substantially in major diameters from 2 to 50 microns. Most of such starch granules, by weight, exceed 20 microns in major diameters, by microscopic examination.

Most of the endosperm particles produced and separated off from the particles of the outer and branny layers of the cereal grain by presently used commercial milling processes, are themselves heterogenous, consisting in many "chunks" or reduced portions of endosperm cells in which smaller or larger ellipsoid-like whole starch granules are found embedded in a matrix of the carrier protein material. Some of the particles produced are relatively fine, consisting mainly of the disintegrated pure protein matrix fragments and of protein matrix fragments which enclose the smallest size starch granules of the endosperm in question. Some of the particles constitute whole starch granules encrusted with a surrounding sheathing or surface layers of their own structure and/or by that of adhering protein and other matter naturally going with the protein.

Of all the cereal grains, the hard wheats, including durum, are the most difficult to grind and reduce by present commercial milling processes. In such grinding, the hard endosperm portions, through the shearing and pressing action of roller mills, or by the splitting and impact action where fling-impact grinds are employed, disintegrate into a greater percentage of "chunks" or endosperm cell parts, as distinguished from the endosperm portions of softer grains. The particles now commercially milled, of hard wheat endosperm, are characterized by rather regularly defined edges (see FIG. 2) with the protein matrix covering the starch granules and extending to and defining the actual edges of the particles as contrasted with commercially milled particles from soft wheat (see FIG. 1) and other relatively soft grains where the starch granules protrude characteristically from the protein matrix and define scalloped edges. In other words, the cohesion and/or other properties relating to the strength or elasticity of the hard wheat endosperm protein matrix embedding its starch granules is higher than that of the soft wheat endosperm.

To the best of our knowledge, prior to our inventions and discoveries, it has not been possible to grind, reduce or surface-treat through dry methods, endosperm portions and particles of cereal grains to produce any substantial release or shelling-out of whole starch granules without bursting, mangling or seriously damaging the same or, in fact, to produce any comminution of hard wheat particles which, even through subsequent sieve separation, will result in flours well suited for use in baking batter-type products such as cakes, cookies, angel food and griddle cakes. It has heretofore, to our knowledge, been impossible in the grinding and reduction of either hard wheat or soft wheat endosperm fragments to release or shell-out any proportion of the myriads of smaller starch granules (less than 22 microns in major diameter) without mangling or otherwise seriously damaging the same.

Today it is well known that the harder type cereal grains, such as hard wheat, generally contain higher protein and are more desirable for dough-type flours, whereas soft cereal grains such as soft wheat contain more starch, are more readily grindable into a fine particle size, and are much better adapted for commercial use in flours and mixes for the production of baked products of the batter type. As a consequence, flour millers have selected and obtained grain such as wheat from various geographical locations which produce grain varying in hardness and protein content and grindability, in accordance with a particular type of commercial flour desired (dough making or batter-type flour). In fact, the types of flour produced in most commercial flour mills are largely determined geographically by the sources of the grain reasonably available to the particular mill. Thus, most mills located in areas where soft wheat is grown, produce flours well adapted for the production of batter-type baked products, while mills located in the hard wheat belts produce largely high protein flours well adapted for dough mixing and the production of bread.

Crops vary from year to year in the same localities as to hardness and protein content. Uniformity and control of commercially produced flours is, therefore, difficult.

It is an object of our invention to produce novel and commercially successful processes for grinding, reduction, and dry-surface treatment of endosperm particles of cereal grains which will make possible the production of various types of flour, to desired specifications, regardless of the hardness or original protein content of the wheat or cereal grain utilized, and regardless of crop variations from year to year in the areas from which the grain is purchased.

Another object is the improvement of the baking qualities of flours used for the production of batter-type products.

A further object is the provision of dry-surface treating and fine reduction processes wherein all cereal flour stocks, including the hard wheat stocks, may be reduced and treated to release in whole, undamaged form, a very substantial proportion of the starch granules produced by roller mill or impact mill grinding, with attendant comminution of the protein matrix or mass in which such starch granules are naturally embedded in the grain.

Another important object of the invention is the dry-surface treatment of cereal endosperm particles to enhance the characteristics thereof for producing better baking results to the end that the specific surface areas exposed in the resultant products is very substantially increased, and to the further and very important end that the substantial portion of released whole starch granules are treated and dressed mechanically and/or thermally in different degree by certain air handling. This air handling, consisting of mechanical rubbing action, heating and drying in travel, loosens and strips and/or removes certain surrounding layer and/or sheath material from the outer surface of the starch granules in such a way as to materially increase water imbibition.

Another important object is the provision of a novel and commercially successful process which makes possible the production of various types of flour to desired specifications with wide spread in protein and starch content of fractions produced from various flour stocks through the close combinative relation of newly discovered effect and novel grinding and reduction with subsequent air separation at selected critical cuts. In this connection, the peculiar type of reduction or grinding and its effect upon the very heterogeneous endosperm particles makes possible fractionation of flour obtained therefrom by efficient air separation to ends and purposes never before attained.

Another object is the provision and processes of the class described to prevent smearing of the fats from germ and other lipid-containing matter upon the flour particle surface.

A still further object is the provision of novel reduction and dry-surface treatment processes for cereal flour stocks which produces particles having quite different physical characteristics from those produced by present commercial milling methods and which new physical characteristics make such particles susceptible to fractionation through critical cut air separation to obtain fractions heretofore unknown.

Another object is the provision, in close combinative relation, of novel reduction and dry-surface dressing processes through which various fractions having remarkable new physical and chemical characteristics may be obtained, with spread of protein, concentration of protein and undamaged starch, removal of lipids and enhancement of moisture imbibition qualities.

Another object is the production of cereal flours and fractions thereof having novel physical and chemical characteristics and having improved baking qualities, particularly in the production of batter-type baked products.

These and other objects and advantages of our invention will more fully appear from the following description, made in connection with the accompanying drawings, wherein like reference characters refer to similar parts throughout the several views and in which.

Figure 1:
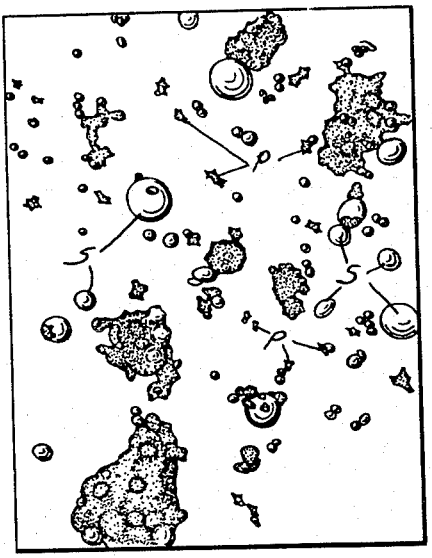
FIGURE 1 is a plan view on a highly magnified (approximately 270 times) scale showing typical particles of endosperm from roller milled soft wheat having been drawn from microphotographs of actual roller milled flour stocks.
Figure 2:
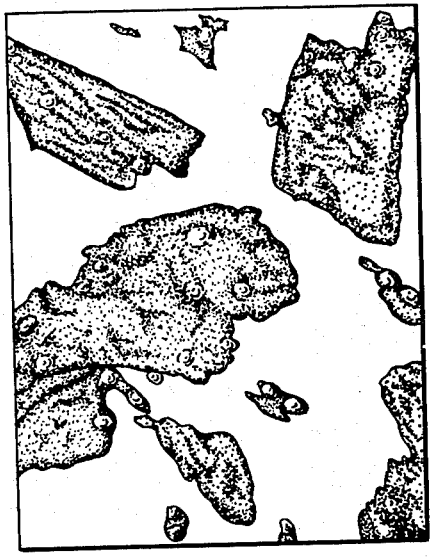
FIGURE 2 is a similar view showing typical fragments of particles of hard wheat endosperm which has been commercially produced through conventional roller mills.
Figure 3:
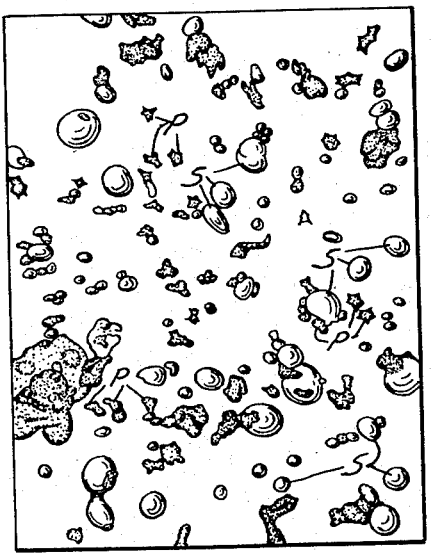
FIGURE 3 is a view similar, and under similar magnification, to FIGURE 1 of the same endosperm or flour stock after it has been treated, dressed and reduced through the employment of our novel process.
Figure 4:
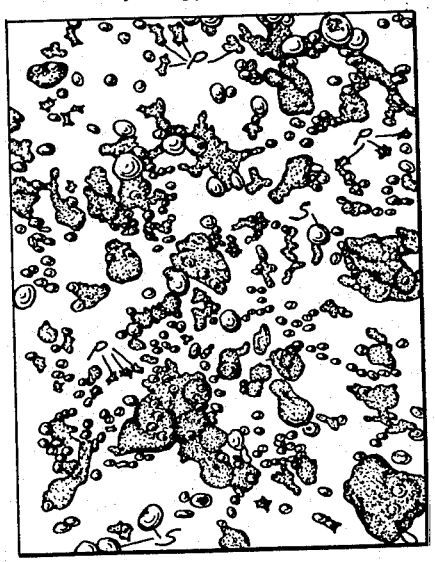
FIGURE 4 is a view similar to FIGURE 3, showing the hard wheat flour stock illustrated in FIGURE 2 after it had been treated, dressed and reduced through the employment of our novel process.

FIGURE 5 is a view similar to FIGURES 3 and 4 and on a similar scale of magnification showing the identical flour stock (soft wheat endosperm) of FIGURE 1, reduced and reground to fine particle size (generally between 15 and 60 micron range) obtained through unusually close setting and provision for greater pressure and shearing action of the conventional rolls of a mill, and showing typical starch fracture and damage;

FIGURE 6 is a view similar to FIGURE 5, showing the identical hard wheat flour stock of FIGURE 2 reduced and reground to substantially fine particle size (between 15 and 80 microns) through the use of close-set conventional roller mills;

FIGURE 7 is a fragmentary, cross-sectional view illustrating diagrammatically opposing, particle-contacting wall surfaces of inner and outer members of a mill or treating apparatus which is adapted for carrying out the method steps of our invention and also diagrammatically illustrating turbulence paths of the fluid medium and a variety of curved paths and passes in the travel of endosperm particles which are reduced, treated and dressed through the employment of our novel method;

FIGURE 8 is a fragmentary, cross-sectional view of another type of mill or apparatus, also well adapted for carrying out the method steps of our novel invention and employment of a rotor having a multiplicity of more-or-less radial walls, partitions or blades (only one pair thereof being illustrated) together with a generally cylindrical, stationary housing and providing together opposing, particle-contacting wall portions, said figure also diagrammatically illustrating turbulence-paths of the medium and a variety of curved paths and passes as well as (in heavy broken lines) one substantially complete circuitous path in the travel of endosperm particles processed by our invention;

FIGURE 9 is a cross-section of a third type of apparatus which is capable, under proper conditions, velocities and other adjustments, of carrying out our process, and wherein no rotary or movable parts in the mill proper are employed, but, through a plurality of high-pressure jet injections of fluid, a multiplicity and variety of generally circuitous fluid paths are set up or generated, affecting the particles treated and resulting in a wide variety of turbulence-paths which include curved passes resulting in the production of endosperm particles substantially freed of the branny, germ and other portions of the natural cereal berries or seeds;

FIGURE 10 is a view drawn from microphotographs like FIGURES 1 to 6, inclusive, and, at the same magnification, illustrating the extent of gelatinization and hydration of the same soft wheat flour stock shown in FIGURE 1 after the same has been subjected for a period of twenty-eight minutes to a surplus of water at a temperature of approximately 75 degrees F.;

FIGURE 11 is a view similar to FIGURE 10, showing the identical hard wheat flour stock illustrated in FIGURE 2 after it has been subjected to a surplus of water at a temperature of approximately 75 degrees F., for a period of three minutes;

FIGURE 12 is a similar view showing the identical reduced and treated soft wheat endosperm particle stock after processing by our invention and as illustrated in FIGURE 3, after the same have been subjected to an excess of water for a period of six minutes at a temperature of approximately 75 degrees F.;

FIGURE 13 is a view similar to FIGURE 12, showing the endosperm particle stock of hard wheat as illustrated in FIGURE 4 (having been processed and treated through the steps of our invention) and after it has been subjected to a surplus of water for a period of three and one-half minutes at a temperature of approximately 75 degrees F.;

FIGURE 14 is a diagrammatical flow sheet showing a seven sub-sieve size fractionation of a commercially roller-milled straight Montana wheat wherein the commercial flour has been subjected to six stages of critical air separation in accordance with the processes and invention disclosed in our copending application, Serial No. 470,244, for the purpose of obtaining maximum protein spread;

FIGURE 15 is a flow sheet wherein an aliquot parent flour stock as is employed in the processing illustrated in FIGURE 14 is first rather intensively ground in accordance with the invention referred to as "turbo-grinding" of this application, and thereafter subjected to six stages of critical air separation to obtain optimum protein shifting through the combination of the steps;

FIGURES 16a and 16b present diagrammatical illustrations of the protein distribution in the seven sub-sieve size fractions produced by the steps of reduction and six air classifications; as diagrammed in FIGURES 14 and 15, respectively;

FIGURE 17 is a diagram or flow sheet showing a commercial application of our process including the novel reduction and air classification steps in combination, as described in Example 11, made a part of this specification;

FIGURE 18 is a graph illustrating alkaline water-retention capacity in the function of temperature of the flours referred to in Example 7b and which were processed in accordance with the step diagrammatically illustrated in flow sheet, FIGURE 15;

FIGURE 19 is a graph on semi-logarithmic paper showing percentage increase in alkaline water-retention capacity per unit temperature in the function of the temperature, thus showing rate of hydration at different temperature levels;

FIGURE 20 is a view illustrating, in front elevation and side elevation and in greatly magnified scale, typical starch damage and fracturing of starch granules through the conventional employment of roller mills in disintegration of endosperm particles; and FIGURE 21 is a view including front elevations and side elevations of two typical starch granules which have been surface-dressed by employment of our novel process, the upper granule g being where intensive turbo-grinding has been carried out and the lower granule f illustrating typical surface treatment where ordinary turbo-grinding has been carried out.

We have discovered that the very heterogeneous "chunks" and particles of cereal endosperm (substantially free of hull or bran substances and aleurone and varying very substantially in size and shape) may be subjected to certain novel, fluid-actuated, surface-dressing, rubbing and multiple-oblique-impact steps and treatment to successively rub down, peel off, knock out and reduce protein portions of the endosperm with simultaneous shelling-out and release of the ellipsoid starch granules (even the smallest, below 22 microns in major diameters) in whole and substantially undamaged state. In such processing and treatment, the starch granules, even the smallest sizes, are surface-dressed and affected by air and heat to change the hydration properties thereof for the production of better baking results.

Our discoveries, including the finding and specification of critical range, air separation steps include and comprise the suspension or partial suspension of said endosperm materials in a fluid medium constantly moved through circuitous general paths of travel at very high velocities, with the attendant and cooperating provision of related hard wall surfaces and with the imparting to said particles in travel of high velocity spinning with resultant rubbing of said spinning particles along and against said hard wall surfaces and with very frequent, multiple-oblique impacts of said particles against said wall surfaces while spinning. Our novel endosperm reduction or grinding, for brevity, will hereafter be referred to as "turbo" grinding.

The application of our discoveries, particularly those which combine our novel reduction and surface-treatment steps with critical air separation, has been facilitated and made standard after our development of a novel method of unit measurement for the fluid dynamic characteristics of the various particles of cereal flours expressed in "F–D" units. A full description of this method of unit measurement is fully set forth in our copending application, Serial Number 470,244, entitled "Cereal Flour Fractionation Processes and Products Derived Therefrom."

It is to be understood that the discoveries and inventions set forth in the instant patent application relate to processes employed upon, and the new products obtained from, endosperm particles (including the so-called "chunks") of the many various sizes which have been previously separated out from the branny material, aleurone portions and outer layer portions of whole cereal grains, as well as from the germ.

In our novel process, endosperm particles are reduced for the most part to extreme fineness. The terminology "sub-sieve" size is used herein to denote a size of particles which readily will pass through the fine commercially-known test sieve such as the test sieve manufactured by W. S. Tyler Company having 325 meshes to the linear inch (105,625 meshes to the square inch) and/or expressed in flow-dynamic units (F–D units) as defined in our copending application, Serial Number 470,244, as approximately 71 F–D.

In FIG. 7, we diagrammatically illustrate one type of apparatus by which our novel turbo-grinding and particle-treating process may be successfully carried out in commercial use to attain the ends of our invention within the desired critical specified ranges hereinafter defined. In its simplest form, this apparatus may comprise a stationary reduction chamber formed from two shell members X and Y, and having a cross-sectional shape, as illustrated in FIG. 7, where angulated, curved and opposing wall surfaces are produced to form, in general, an enlarged, multi-facet chamber of oval or cylindrical shape in cross-section at most points transverse to the axis thereof.

Endosperm particles previously substantially freed from bran, germ and the other enveloping layers of the grain berries, outside of the endosperm, are fed into the entrance E, being suspended by air or other gaseous medium which is introduced at various points in said entrance in the direction of the large arrows A at high velocity. The entering particles and air, because of the multi-facets, pockets and wall portions formed on the opposing, circumferential portions of the reduction chamber, pass through a great multiplicity of very high speed turbulent circulations, a number of which are indicated by the curved lines, such velocities of air and particles in said turbulence-paths reaching maximums preferably in excess of 20,000 feet per minute, resulting in the very rapid spinning of the particles on their own respective axes, the rubbing of said spinning particles obliquely and along numerous of the hard wall surfaces and a great multiplicity of oblique impacts of the particles against wall surfaces with, of course, a large amount of attendant attrition of spinning particles against spinning particles. The reduced material in the flow of the gaseous medium outwardly through the outlet O has been treated by said multiplicity of rubbing and spinning contacts with the walls and by the great multiplicity of oblique impacts to cause corners of the heterogeneous endosperm particles to be rubbed off and to cause a very substantial proportion (even in hard wheat) of the individual starch granules to be shelled out of the previously adhering or enveloping protein matrix while that protein material has been successively reduced in said reduction chamber to a relatively very fine state.

While the first conception of the apparatus of diagram 7 described is a simple, single reduction chamber, the same principle with addition of centrifugal force and Coriolis forces may be obtained if member Y is a rotor, the portions shown in the drawing representing only one segment and member X is a circumferentially arranged stator with a plurality of pockets having multi-facet walls related to the corresponding number of pockets in the rotor Y, said rotor being rapidly driven and revolved upon an axis concentric with the curved line A—A of the outer part X.

In FIG. 8, a portion of a satisfactory reduction or grinding mill employing our turbo-grinding discoveries, is illustrated with only a segment of the rotor and stator being shown. The mill comprises a plurality of surface-conditioning and reduction chambers C constituted or defined by a multi-bladed rotor R revolving on an axis A and having the blades B radially arranged, said chambers being further defined by a generally cylindrical rotor housing H, the interior wall of said housing, as well as said blades B, being preferably constructed from hard and/or abrasive material to furnish abrasion and impact. Any suitable fluid medium such as air is introduced and rapidly circulated through the mill or system, generally in an axial direction from end to end, and through the influence of said rotor, producing a general exterior vortex (relative to the rotor) in an orderly or systematic flow pattern. Endosperm particles such as commercial flour stocks or middlings previously substantially freed from branny portions, germ, aleurone and the other layers encircling the endosperm cells of the grain is fed peripherally of the rotor into housing H at one or more locations adjacent the air intake of said housing. The endosperm particles are substantially suspended by the very rapidly circulating air, and the air in the various vortices, turbulent currents and circuitous paths and passes, of course, influences and directs the travel of the various and very widely variable endosperm particles.

The general directional travel of most of the endosperm particles within any one of the chambers C is along variable circuitous paths, of which the path indicated by the heavy dotted lines $a$, $b$, $c$, $d$, $e$, $f$ and $a'$ is exemplary. The fine lines and arrows on FIG. 8 indicate a large number of variable passes, mostly curved passes, through which the particles travel in their circuitous general travel about and within the various chambers C of this apparatus. The velocities of the particles in the turbulent circulation and in the circuitous paths is preferably maintained above 20,000 feet per minute as essential to produce the desired, spinning, abrasive, attritional and shelling-out and granule-treatment results desired.

The circuitous paths $a$, $b$, $c$, $d$, $e$, $f$ and $a'$ are typical of a substantial number of the millions of individual particles treated and while, sometimes, an individual particle is subjected to more than one of said circuitous paths in an individual reduction chamber C, more often, in the rapid revolution of the rotor, the same particle upon completion of one of said paths goes through a somewhat analogous circuitous path in the adjacent chamber which has moved into receiving position from the point $a'$ on the inner peripheral wall of the stator.

In FIG. 9, another type of reduction or grinding apparatus is shown which, with proper adjustment and velocity of fluid flow and without relative rotation of parts, is capable of carrying out the novel reduction steps of our process. Here a generally circular jet-apparatus is shown having an intermediate, enlarged, generally cylindrical particle-contact wall 20 into which endosperm particles are fed in a somewhat tangential direction through an elliptical opening in the top portion thereof, diagrammatically illustrated by the dotted line O. The discharge of this mill is axial, preferably through the top thereof (the top being removed in the single view of the drawing), the discharge area being indicated in dotted lines as D.

Various means may be utilized to set up a high speed, generally vortex flow of the actuating and particle-suspending fluid such as high pressure air jets 24, communicating at an acute angle with the interior of the annular flow chamber 20 at a plurality of circumferentially spaced points. The effect is to create very high velocity, general vortex flow while simultaneously producing, at the areas of the high pressure, entering fluid, high speed turbulent currents which produce high velocity spinning of the endosperm particles within the mill in multi-directional, but nevertheless generally circuitous, paths to thereby produce frictional, multi-oblique impact and rubbing of the particles against the hard abrasive surface of the annular flow passages.

Our discoveries have proven that, regardless of the specific apparatus utilized, certain combinations of steps and common characteristics are essential for producing our desired results on the very heterogenous and widely variant endosperm particles. These may be summarized as follows:

(1) The endosperm particles must be suspended, or at least partially suspended, and moved in a fluid medium (preferably a gaseous medium such as air).

(2) The endosperm particles must be actuated and carried by the fluid medium at high velocity and caused to rapidly move through a variety of generally circuitous paths which include a multiplicity of high velocity turbulence travels and a number of curved passes or travels located along contact or reducing surfaces. The velocity range in the faster travels of said particles is preferably above 20,000 feet per minute.

(3) Throughout the variety of travel paths of the particles, rapid individual spinning thereof is imparted on their own independent axes.

(4) Along the multiplicity of curved line passes or travels of the endosperm particles, a great multiplicity of impacts of particles against contact or reducing surfaces at oblique angles and in combination with spinning of the particles together with attrition, occur, thereby rubbing off surfaces and corners, peeling and jarring off the less cohesive parts of the particles and unexpectedly shelling-out and releasing free starch granules of all sizes, including the finer starch granules of less than 20 microns in major diameter. These same functions or steps simultaneously finely comminute the less cohesive protein matrix portions.

In the selection and use of apparatus for carrying out the reduction and dressing steps of our process, an apparatus which is provided with a plurality of chamber-forming walls to produce, in operation, a multiplicity of interwall general vortices is preferred, such as, for example, the apparatus, a portion of which is illustrated in FIG. 8. It is desirable that, in apparatus of the general type of FIGS. 8 and 9, the endosperm particles to be disintegrated and treated be fed into the machine peripherally of the rotor in machines such as shown in FIG. 8, and tangentially to the interior of the housing of FIG. 9, as contrasted with axial feeding.

IMPORTANT UNEXPECTED RESULTS

It is to be understood that our inventions and discoveries consist in the employment of our peculiar type of grinding, reduction and surface treatment or dressing with and without the combinative steps of critical air separation upon cereal endosperm particles or fragments previously substantially freed from the other substances or layers of the kernels or grains such as hull portions, branny layers, aleurone layers and a large part of the cereal germ. As applied to such endosperm fragments or particles, a number of very valuable and wholly unexpected results have been discovered and obtained, among which the following are outstanding:

(1) A very substantial proportion of all of the starch granules, including the smaller granules having major diameters below 22 microns and even down, in instances, to below 10 microns, are released and shelled-out in substantially whole and undamaged state and simultaneously modified mechanically to produce better or improved baking qualities.

(2) The foregoing results are accompanied with a very fine "sub-sieve" particle size disintegration of the protein constituents and matrix, making available, through subsequent critical air separation steps, protein spreads and concentrated starch and protein fractionation never heretofore attained.

(3) A tremendous increase in the free-uncoated aggregate surface of starch granules (indexed by specific surface) is produced through the previously mentioned shelling-out of starch granules of all sizes and, further, by mechanical dressing and surface treatment of the starch granules in our novel steps of grinding and reduction.

(4) Substantial elimination of the pressure-smearing of free fats and lipids from particles of germ or from other lipids contained morphologically in those substances (including protein) which surround the starch granules proper.

Re: Point 1 (substantially all starch granules, including the smallest—shelled-out)

Exhaustive microscopic examination of the very fine endosperm particles produced through our novel reduction and grinding steps, shows that, even in the case of the harder cereal grains, such as hard wheat, a very substantial proportion of all starch granules including the smallest, in many instances below 10 microns in major diameter, are released in substantially whole, undamaged state without cleavage, shearing or bursting thereof. Such release or freeing of discrete, undamaged starch granules, to our knowledge, was unknown before our discovery.

Conventional roller mill grinding or fling-type impaction upon the softer cereal grains such as soft wheat has, in the past, resulted in release of some small proportion of the larger starch granules, usually above 30 microns in major diameter. Attempts to intensify roller mill grinding to obtain finer particle size by very closely spacing the rolls and attempts to similarly decrease particle size in fling-type impaction through higher peripheral speeds and increase in the number of passes or operation, has caused serious mangling, cutting, cleaving and bursting of substantially all such granules where an ultimate particle size was obtained below a 16 Fisher value on hard wheat and below a 12 Fisher value on soft wheat. With our process, the reduction may be carried out to produce fine particle size, for example, down to approximately 8 Fisher value on hard wheat and a 7 Fisher value on soft wheat without mangling, bursting, cleaving or otherwise mechanically damaging the starch granules of all sizes.

The disintegration in our novel grinding steps is not believed due to any absolute pressure differences between the inside of the endosperm particles or the outside pressures, nor has such disintegration to do with high intensity sonic vibrations.

Such unexpected results make available flours for the production of batter-like products such as layer cake and angle food cake which have improved baking qualities since the finer particle size and whole, undamaged starch granules (leaving out the advantages from the unexpected results in point 3, supra) provides much greater exposed or specific surfaces which inherently improve the hydration characteristics of the particles during making of the batter and during baking.

In FIGS. 1 to 6 of the drawings, views made from microscopic* pictures and microscopic studies of hard and soft wheat, the foregoing unexpected results, as enumerated in point 1, are well illustrated. In FIG. 1, soft wheat conventionally roller milled is shown, and it

*Magnification 260 times.

will be noticed that some small proportion of the relatively large starch granules (of ellipsoid shape) have been released or almost released from adhering portions. However, most of the smaller starch granules are still agglomerated or embedded in matrix protein portions.

In FIG. 2, conventional roller milled hard wheat flour is shown with substantially none of the whole starch granules being totally released. This is typical of all presently milled commercial hard wheat flours.

In FIG. 3, the identical soft wheat flour stock of FIG. 1 is illustrated after treatment and reduction through the employment of our novel process steps to produce particle size and distribution having a 9.8 Fisher value. Here, the substantial release of whole, undamaged starch granules in discrete form is well illustrated (particles of generally ellipsoid shape). These whole starch granules, readily distinguishable in FIG. 3, range in size from below 10 microns in major diameters to granules above 40 microns in major diameter. The smaller, irregularly shaped particles illustrated in FIG. 3 are, for the most part, free protein particles and, in some instances, constitute agglomerates of protein and smallest starch granules.

In FIG. 4, the identical flour stock of FIG. 2 (hard wheat) is shown after it had been processed and reduced through the novel steps of our invention to a Fisher value of 10.25. Here again the ovoid and ellipsoid particles illustrated are starch granules in substantially whole and, in many instances, discrete form ranging in size from below 10 microns in major diameter to 45 microns (in the case of the very largest). The contrast between particle size, presence of free starch granules and release and reduction of the protein matrix matter in the particles illustrated in FIGS. 2 and 4 is truly significant.

Furthermore, it will be noted from the illustrations (FIGS. 1, 3 and 4) that, unexpectedly, hard wheat, when processed through our invention, is reduced and physically changed to resemble in particle distribution presence of discrete protein particles and discrete whole starch granules to be generally quite similar to those characteristics typical in soft wheat. This unexpected result makes possible, with efficient subsequent fractionation such as by critical cut air separation, fractions from hard wheat which are well suited for cake flours or mixes and for flours for preparation of other batter products.

In FIGS. 5 and 6 are illustrated typical particles obtained from the identical roller milled flour stock of FIGS. 1 and 2 where a reduction to finer particle size has been accomplished through intensive roller mill repeated regrinding steps where the rolls have been set closer together in an endeavor to aproximate particle distribution and fine particle size of the products of our invention illustrated in FIGS. 3 and 4. In FIG. 5, the identical soft wheat flour stock of FIG. 1 was intensively and repeatedly reground by close-set roller mills obtaining a particle distribution and size of 7.9 Fisher value. In FIG. 6, particles of hard wheat similarly reduced through intensive close-set roller mill regrinding are illustrated, having a Fisher value of 7.4.

Contrasting the illustrations of FIGS. 5 and 6 with FIGS. 3 and 4, it will be noted that, in the particles of FIGS. 5 and 6, comparatively few of the smaller starch granules are released and that, in most instances, the starch granules which are released have been fractured, bust or segments cleaved therefrom, all in contrast to the typical release in whole, undamaged state of starch granules of all sizes, including the smallest, through the employment of our novel process.

Further illustrations of the substantial damage to starch granules which occurs in roller mill grinding or fling-impact grinding when such grindings are intensified to produce a fine particle size, even remotely comparable by Fisher values to our improved "turbo" grinding and reduction steps, may be observed from consideration of FIG. 20. FIG. 20 illustrates in greatly magnified scale, typical and generally characteristic damage and fracturing of starch granules within a size range between 16 and 32 microns in major diameters when regrinding by closely-set rolls of roller milling is employed. The drawings were made after intensive microscopic study had been completed on the part of the applicant Gracza with Gracza's sketches of many starch granules observed through the microscope, a number of which granules were disposed edgewise to the line of sight, and a number of which were disposed substantially normal to the line of vision. From the many sketches, five typical particles identified by the letters a, b, c, d and e, are reproduced here, the left hand column of views being plan views, or where the particle is disposed substantially normal to the line of vision (position of maximum stability), and the right hand column illustrating the same particles, a to e inclusive, taken in side elevation or turned 90 degrees from their position shown in the left hand column. Starch granule a, it will be noted, is cleaved almost diametrically on its major axis. Starch granule b is split or cut on a plane substantially normal to the major axis. Starch granule c has had a sector cut or cleaved therefrom which is very typical. Starch granule d has been centrally fractured with a more-or-less circular peripheral portion removed therefrom. This was very typical of many particles of hard wheat carefully inspected under the microscope. Starch granule e has had a generally segmental portion removed therefrom, extending through half of its thickness and in an irregularity at its central portion. It will be understood that any combination of the (a to e type) damage may be present.

In FIG. 21, two starch granules, f and g, are illustrated in plan and side elevation, which were picked from many, many particles carefully inspected by the applicant, Gracza, by viewing and projecting with great magnification by microscopes. The granule f is typical of a great many whole, discrete starch granules shelled-out, released and dressed by employment of our improved process. The light, more-or-less concentric lines indicating, as shown in the microscope, some slight separation or deformation, we believe of layers or strata of different molecular structure within the starch granule itself. Such characteristics are typical of the starch granules, large and small, released and dressed through our novel process where the "turbo" grinding is not intensified.

Starch granule g of FIG. 2, in an abstract way, typifies released, whole starch granules obtained through the employment of our novel process where the reduction steps are intensified to produce particle distribution and size as low as a 7 Fisher value. Here it will be noted, in addition to the typical light concentric lines observable on starch granules such as f, very light cracks or short fissures radially extending at the very peripheral edges of the granules are present. The factors and functions of our process responsible for the dressing and physical changes of the starch granules, as illustrated in FIG. 21 and the advantages thereof to improve baking qualities, will be fully brought out in accordance with our knowledge and beliefs, hereafter.

Re: Point 2 (subsieve particle size disintegration of protein constituents)

In employing our grinding, reduction and particle dressing steps, the endosperm, fragments, chunks and particles previously substantially freed from the other portions of the cereal kernels or grains, are reduced to "sub-sieve" size even in the case of hard grains such as durum (of a size which will easily pass through commercial test sieves having 325 meshes to the linear inch). In the case of the particles illustrated in FIG. 3 (soft wheat), the Fisher value of the large sample obtained by relatively moderate "turbo" grinding was 9.8 (reduced from 11.0 Fisher). In the case of the particles illustrated in FIG. 4 (hard wheat), a more intensive reduction through our novel process steps was utilized, resulting in a Fisher value of 10.25, reduced from 20.4 Fisher, for the relatively large sample obtained. In both cases, the released, whole starch granules of the largest size and most all of the remaining agglomerates were of the sub-sieve size.

In FIGS. 3 and 4, a number of the protein matter particles of irregular shape are indicated by the letter p, many of them being in discrete form and some still adhering to a starch granule or granules. These very small particles, as was disclosed in pending application, Serial No. 470,244, may be withdrawn by critical air separation with, of course, the smallest whole starch granules to obtain, in the combination of our reduction and dressing steps and subsequent critical air separation steps, protein spreads and concentrated starch and protein fractions never heretofore obtained. In this connection, during subsequent low critical air separation, a small amount of the agglomerates will be broken down, freeing additional protein particles from starch granules. We have found, as will be shown in several of the samples hereinafter given (Examples 7a and 7b) that, heretofore, unknown protein spread is possible without regard to the protein content of the natural grain employed, and that fractions of higher starch and protein content respectively are attainable with our process including the reduction, dressing and subsequent air separation steps. (See FIGS. 16a and 16b.)

Re: Point 3 (surface dressing and treatment of starch granules)

Through the employment of our novel grinding reduction and surface treatment or dressing upon cereal endosperm particles or fragments of both hard and soft wheat characteristics, truly unexpected and substantial increase in the free, uncoated aggregate surface (as indexed by specific surface) of starch granules is produced. In FIGS. 1 to 3, the comparison between the relative number of whole starch granules found in commercially milled (roller ground) soft wheat and in the particles produced through our novel process is well illustrated. A much larger percentage of the starch granules above 22 microns in major diameters is obtained through our novel grinding and reduction but, moreover, the proportion of small starch granules under 22 microns in major diameters and down to diameters as low as 10 microns, is very substantial through the use of our process, as illustrated in FIG. 3. The comparison is more pronounced in favor of our products obtained through so-called "turbo" grinding, as seen in FIGS. 2 and 4 (hard wheat). In all instances, the aggregate or total of all uncoated or free starch granule surfaces was tremendously increased as compared with any now used commercial methods of grinding or reduction of cereal endosperm particles.

If, to attain a finer particle size or Fisher value, an attempt is made to regrind intensively by roller mill action or by intensifying or repeating fling-impact grinding, the starch granules resulting therefrom, as characteristically shown in FIGS. 5 and 6, are badly damaged, a still comparatively small proportion of free starch granules is obtained as compared with the results of our novel process. In fact, even with such intensified grinding by roller mill or fling-impact, which is commercially impractical, very few of the smaller starch granules below 25 microns in major diameters are released. Furthermore, as well illustrated in FIGS. 5 and 6, most of the starch granules which are released, of the larger sizes, still have protein portions or other matter adhering. They are not uncoated.

With our process steps of reduction and dressing, the protein matter and other matter closely adhering to the starch granules proper, is loosened and/or peeled and/or removed. With it, other matter such as the lipids are also removed. A very large proportion of the discrete starch granules obtained through our process are whole and substantially undamaged and are substantially uncoated.

These surface treated or dressed starch granules are more susceptible to imbibition of water within certain temperature range than starch granules found in any of the commercially milled endosperm products produced commercially at this time by means of dry method. The starch concentrated fractions obtained through our novel process steps have been found to have materially altered baking qualities as evidenced by the extensive tests and proofs we have made, some of which hereafter will be set forth in the examples appended. The altered baking qualities of said fractions are particularly favorable for production of baked products from certain of the batter-dough.

We believe and there are proofs which show that the novel surface treatment and dressing of starch granules through employment of our improved process and which is responsible for the changed and improved baking qualities and hydration properties referred to, is due to several factors working together, to wit, (a) the mechanical abrasion, rubbing, spinning, attrition and oblique impact of the particles in their circuitous movements and in their many turbulence paths through general circuitous paths between walls of the apparatus; (b) the very substantial aeration and treatment of the particles by relatively dry, gaseous medium (preferably air) during their great multiplicity of travels and paths, causing fast drying of the exterior surface of the granules; (c) the factor of heat at controlled, elevated temperatures produced through the rapid and manifold travels of air current and particles. Within the scope of our invention, such controlled temperatures may be still further elevated or supplemented by introduction of heat from outside source, including exothermic source.

Note: Both of the last mentioned treatments (b) and (c) (aeration and heat under control) produce fast action drying of the surfaces of the starch granules and also oxidation of chemical compounds of the particles. It is also believed that the heat has effect upon the lipids in the protein and starch particles.

Depending on the degree of the above factors and the time involved, finer or thicker exterior strata of the starch granules becomes dry to a degree to produce local tension by shrinkage through local moisture loss. Such stresses effect the starch granules and/or lipid complexes of the dried strata, producing small fissures or disturbance of the material continuity of the starch-granules-surfaces such as is illustrated abstractly in FIG. 21 (granules *f* and *g*), in contrast with the character of cleaving or starch damage illustrated in FIG. 20 (granules *a* to *e*, inclusive) which exemplify starch granules reduced by commercial milling procedures.

After the steps of our grinding and treatment have been applied and completed, the dried layer or strata of the starch granule surface regains at least partly its moisture content, absorbing some moisture from the interior of the granule, i.e., from the inside crystalline complex substances. As the exterior layer regains moisture content the local surface tension decreases and with it the fissures disappear or substantially decrease, becoming at least partially invisible under high microscopic examination.

The above phenomena would seem to of necessity produce changes in the molecular structure of the starch granules along the fissure-surface, which we believe reduces the more complex molecular chains into less complex molecular chains. Definitely a mechanical-physical modification of the granule occurs.

When the three factors previously mentioned—(a) mechanical action; (b) drying by aeration; and (c) controlled heat effect are simultaneously applied in the carrying out of our novel process, the previously recited treating of the individual starch granule surfaces occurs, to the end that immediately adhering protein matrix and the other substances including lipids which are present with protein in the said coating or surrounding material, is loosened and/or peeled and/or removed and the starch-granule-surfaces aerated, controllably heated and oxidized. Since the starch granules are relatively elastic the mechanical travels and treatments subject them to an elastic deformation cooperating with the other phenomena to we believe, produce molecular structural changes especially affecting the inner strata of the granules in which the less resistant, complex, crystalline starch material is by nature deposited.

To visually, through microscopic examination, compare hydration properties of the original parent flour stocks with the products of our improved process in connection with the grinding, reduction and surface treating steps, FIGS. 10 to 13 of the drawings are included in this application.

FIG. 10 illustrates with intensive microscopic enlargement, at 260 times, the appearance of many particles of the identical soft wheat flour stock illustrated in FIG. 1 after having been subjected to a surplus of water for a period of 28 minutes at a temperature of 75 degrees F. It will be noted by comparative study of FIG. 1, showing the same soft wheat stock before being subjected to moisture, that the starch granules of FIG. 10 have enlarged only slightly if any, have not produced fissures or show the appearance of moisture-absorption to any substantial degree.

FIG. 11 shows the same hard wheat flour stock as is illustrated in FIG. 2 of the drawing, after it has been subjected to a surplus of water at a temperature of 75 degrees for a period of three minutes or slightly in excess thereof. It will be noticed by comparison of the particles illustrated in FIG. 11 with the particles shown in FIG. 2 of the drawings, that only a very slight change has occurred in the size and expansion of the said starchy particles. The hard wheat starch granules in FIG. 11 have not to any substantial extent produced fissures, burst or enlarged in size as compared with the dry starch granules of FIG. 2, showing that in the three minute period for water imbibition only a very slight imbibition has been effected.

In FIG. 12, the same soft wheat flour stock having been processed with our novel so-called "turbo" grinding steps has been subjected to an excess of water at a temperature of 75 degrees F., for a period of six minutes. By comparison of the particles of FIG. 12 with the particles shown in FIG. 10 of the drawings and also with the particles of FIG. 3 of the drawings, it will be noted that in FIG. 12, the starch granules have swollen and have produced fissures near the peripheral edges thereof and clearly indicate the absorption of a substantial amount of moisture.

In FIG. 13, particles of hard wheat endosperm, after reduction through out novel processes of grinding, reduction and surface treatment have been subjected to a surplus of water for a period of three and one-half minutes, at a temperature of 75 degrees F. These starch granules from hard wheat flour stock have absorbed a substantial amount of water, being swollen and enlarged as contrasted with the identical stock without moisture, shown in FIG. 4.

By comparison the starch granules illustrated in FIG. 13 ("turbo" ground) with those shown in FIG. 11 (merely roller mill ground), it will be seen that the water imbibition indicated by swelling, partial bursting and producing of fissures of particles dressed and reduced by our novel process, is very substantially increased, as contrasted with the slight imbibition of the starch granules illustrated in FIG. 11 (merely roller milled hard wheat flour stock).

In making the careful microscopic examinations and tests from which FIGS. 10 to 13, inclusive, of the drawings were obtained, the hydrating medium for the particles under slides comprise a 1% aqueous solution of Congo red. Visually through the microscopic hydration of the starch particles could be observed through the red color of the solution appearing within the granules. The increase of shade or color in the granules appeared substantially parallel with the increase in the minute fissures of the starch-granule-surface, as depicted in FIGS. 10 to 13 inclusive. By hydration the almost invisible fissures imparted by our novel grinding and dressing treatment became more and more visible as hydration proceeded in time.

Specific hydration characteristics of our "turbo" ground endosperm particles (specifically flour) is shown with the increasing heat conductivity index running parallel with the increasing intensity of grinding, as fully set forth and explained in Example No. 9, which follows in the specification. Such heat conductivity index and its derivative characterises the hydration properties as a function of time.

In another example set forth herein, to wit, Example No. 10, another specific hydration characteristic of "turbo" ground endosperm particles is shown in its increased changing rate in alkaline water-retention capacity with the increasing degree or intensity of our "turbo" grinding, specifically the change in alkaline water retention by temperature unit increases.

EXAMPLES

In the following examples the ash, protein, moisture, fat, diastatic activity (maltose) were all run according to standard methods as set forth in "Cereal Laboratory Methods," fifth edition, 1947. The protein, ash and maltose figures hereinafter quoted were thereafter adjusted to a uniform 14% moisture basis. The cake baking tests hereinafter quoted were carried out under standardized baking tests at substantially similar pH values, and the results tabulated in accordance with the previously identified authority. The hereinafter quoted Fisher values were arrived at with constant porosity of 0.465 in accordance with the standardized method described in the publication of B. Dubrow, "Analytical Chemistry," volume 25, 1953, pp. 1242 to 1244. (Fisher Scientific Co., Pittsburgh, Pa., "Directions for Determination of Average Particle Diameters, etc.").

The alkaline water-retention values hereinafter quoted were arrived at through the recognized AWR capacity test as described in the publication "Cereal Chemistry" of May 1953, vol. 30, #3, and these values are regarded as a measure of water imbibition capacity.

The units of measurement referred to as "F-D" units utilized to evaluate particle size distribution through a method of centrifuge sedimentation are in accord with the method fully set forth and explained in co-pending application, S.N. 470,244, and incorporated hereinafter.

*Example 1*

This example is presented in order to show our reducing, surface treating and dressing endosperm particles through the employment of our novel process, increasing materially the opportunities for protein shifting in flour fractionation by sub-sieve size separation.

A parent A grade flour commercially milled out of straight Nebraska hard winter wheat has been reground by our process to two different granulations expressed by Fisher value (specific surface). Reground samples have been air separated into coarse and fine fractions.

The protein content of the parent flour (XT-4350) was 9.51%, ash content, .356%, with a Fisher value of 19.4 (measuring average granulation by specific surface of 19.4). Regrinding in the first case produced a flour (XT-4352) with a Fisher value of 16.0. This flour has been air separated at a critical cut of 20.5 FD unit producing a coarse fraction (XT-4388), representing 90.6% of reground stock, and had a protein content of 9.1%, ash content .352%, with a Fisher value of 17.0. The fine fraction (XT-4389) of the same classification procedure, representing 9.4% of the reground stock, had a protein content of 19.9%, ash content .733% with a Fisher value of 4.2.

More intense regrinding by our process in a second case produced a flour (XT-4353) with a Fisher value of 9.2. Succeeding air separation performed at critical cut of 13 FD unit produced a coarse fraction (XT-4386) representing 87.9% of the reground stock, having a protein content of 7.7%, ash content .323% with a Fisher value of 10.8. The fine fraction (XT-4387) of the same classification procedure representing 12.1% of the reground stock had a protein content of 22.3%, ash content .750%, with a Fisher value of 3.45.

In comparing the above two regrinding cases, the more intense regrinding from a Fisher value of 19.4 to 9.2 produced more protein shifting (22.6%) after classification than did the slight regrinding (protein shifting 18.5%) from a Fisher value of 19.4 to 16.0.

*Example 2*

This example is presented in order to show characteristic differences on products if processed by conventional milling methods in comparison to our novel "turbo" grinding, using microscopic observations and the descriptive method of morphology.

More specifically, our exhaustive tests have shown that with our novel disintegration and surface dressing steps a hard wheat stock may be processed to obtain therefrom flour of similar morphology and similar baking characteristics to a flour made from soft wheat.

The above statement is well demonstrated by comparison of FIGS. 1, 2, 3, and 4 where respectively drawings made from microphotographs of soft wheat parent, hard wheat parent, soft wheat turbo-ground, and hard wheat turbo-ground flours are presented all in 240 times magnification. Visual consideration of said drawings clearly show that the particle size and shape characteristics of the hard wheat, turbo-ground flour (FIG. 4) are similar in many respects to the soft wheat parent flour stock (FIG. 1) and to the soft wheat, turbo-ground flour (FIG. 3). In addition to the above gained visual impressions, the following suggestions will facilitate specific comparison:

(*a*) Observe oblong shaped particles (endosperm chunks) with clear definite edges and sharp corners (in FIG. 2) versus indefinite contour irregularly shaped particles (endosperm chunks) with indefinite, lacerated edges in FIGS. 1, 3, and 4.

(*b*) Observe presence (in FIGS. 1, 3 and 4) and absence (in FIG. 2) of starch granules protruding from the endosperm chunks.

(*c*) Observe frequency order of shelled out free starch granules (FIGS. 1, 2 and 4 vs. FIG. 2).

(*d*) Observe frequency order of clean uncoated starch granules, where no protein matrix is adhering to the starch granule (FIGS. 3 and 4 vs. FIGS. 1 and 2).

(*e*) Observe frequency order of free protein matter particles (FIGS. 3 and 4 vs. FIGS. 1 and 2).

*Example 3*

This example shows how progressively more intense reduction and surface treatment through our novel processes increase the cake baking capacity of a flour.

A commercially milled long patent flour out of a blend of 85% northern Indiana soft wheat and 15% Michigan soft white wheat has ben processed by subsieve size air separation and extremely light regrinding which produced a parent flour (XT-5196) having a protein content of 7.6%, moisture of 11.2%, ash content of .354%, with a Fisher value of 11.55, maltose value of 89, and AWR (alkaline water retention) of 55.1%. Approximate processing of this long patent flour comprised an air separation step performed at critical cut of approximately 19.5 FD unit. The coarse fraction of this separation with very slight regrinding is the parent flour. Fine fraction (XT-5198) representing approximately 5% of the long patent flour had a protein content of 20.54%, moisture of 10.0%, ash content of .443%, with a Fisher value of 3.95. Parent flour (XT-5196) has been reground by our process individually to decreasing Fisher values according to the following tabulation at the left; layer cakes at 115% sugar level and at 140% sugar level and angel food cakes were baked from each of the tabulated stocks including the parent stock (XT-5196). The volumes of the cakes baked respectively appear in the columns at the right:

| XT No. | Fisher | Malt | Alk. WR | Low ratio layer cake 115% sugar vol., cc. | High ratio layer cake 140% sugar vol., cc. | Angel food ht., inches |
|---|---|---|---|---|---|---|
| 5196 | 11.55 | 89 | 55.1 | 2,336 | 2,197 | 3 3/16–3 5/16 |
| 4906 | 11.15 | 104 | 56.3 | 2,416 | 2,197 | 3 5/16 |
| 4909 | 9.6 | 110 | 63.5 | 2,448 | 2,305 | 3 5/16 |
| 4911 | 8.55 | 115 | 66.8 | 2,480 | 2,352 | 3 7/16 |

As tabulation shows, with more intense treatment by use of our process as expressed by increasing specific surface (lower Fisher), cake volumes increased in the 115% and 140% sugar cake formulas, similarly increased height of angle food cakes. Tabulation indicates increasing water imbibition capacity with increased degree of regrinding.

*Example 4*

This example is presented in order to show that reduction and surface dressing by our process of a hard wheat flour improved cake baking performance.

A commercially milled hard wheat patent flour out of straight Nebraska winter wheat has been reground by our process individually to decreasing Fisher values, means increasing fineness of reduction and increased degree of surface handling. Above parent flour (XT-4923) had a protein content of 10.1%, moisture of 10.2%, ash content of .361%, with a Fisher value of 17.5, maltose value of 164, and AWR of 58.7%. As the following tabulation shows, increasing degree of said "turbo" regrinding as expressed in increased specific surface (decreasing Fisher value) improved cake baking performance of the hard wheat parent flour as demonstrated by the volume figures of three different types of cake, 115% sugar layer, 140% sugar layer and Home Bake, which were baked under optimum conditions from five different "grinds," including the parent stock (XT-4923):

| XT No. | Fisher | Malt | Alk. WR | Low ratio 115% sugar layer cake vol., cc. | High ratio 140% sugar layer cake vol., cc. | Home bake vol., cc. |
|---|---|---|---|---|---|---|
| 4923 | 17.5 | 164 | 58.7 | 2,082 | 1,987 | 2,682 |
| 4961 | 13.15 | 180 | 55.2 | 2,176 | 2,145 | 2,730+ |
| 4962 | 11.15 | 210 | 62.5 | 2,224 | 2,192 | 2,761+ |
| 4964 | 9.65 | 234 | 66.7 | 2,428 | 2,271 | 2,777+ |
| 4965 | 8.55 | 256 | 75.0 | 2,302 | 2,334 | 2,891+ |

Water imbibition capacity increased with increasing degree of applied "turbo" regrinding.

Heretofore to our knowledge, hard wheat has been considered unsuitable for production of flours capable of being into commercially satisfactory high sugar ratio cakes of adeqaute volume and light texture. The foregoing data shows that very satisfactory layer cakes and home baked cakes may be obtained through the use of our novel process.

*Example No. 5a*

This example is presented to compare baking tests for layer cake and angel food cake wherein the batters were prepared respectively from flours disintegrated and treated by our novel process as contrasted with commercially available roll reground flours. Soft wheat.

A commercially milled soft wheat patent flour produced from a blend of 85% northern Indiana soft wheat and 15% Michigan white wheat, has been selected for a parent flour (XT-8443), having a protein content of 7.95%, moisture of 12.3%, ash content of .295%, with a Fisher value of 11.8, maltose value of 108, AWR of 49.0%, and MacM viscosity of 63, baking a 140% sugar layer cake of 2137 cc. volume, an angel food cake of 3 5/16" in height.

Above parent flour has been submitted individually to regrinding by peerless cut rolls, applying increasing intensity of regrinding—sample #XT-8476 with slight regrinding, XT-8477 with medium regrinding, and XT-8476 with most intensive regrinding within the scope of this test. Increased regrinding by commercial roll procedure is indicated by slightly decreasing Fisher values and by substantially increasing maltose figures.

Same parent flour (XT-8443) was individually submitted to increasing intensity of regrinding by use of our process—sample #XT-8490 with slight regrinding, XT-8446 with medium regrinding, and XT-8574 with most intense regrinding (within the scope of this test). Decreasing Fisher values (increasing specific surface) indicate increasing intensity of turbo regrinding procedure.

Samples from the flour produced from each of said reduction or regrinding procedures was set apart and under optimum conditions, a number of 140% sugar layer cakes were baked from each, as well as a number of angel food cakes.

The following tabulation demonstrates testing data of the above presented flours:

|  | XT No. | Fisher | Prot. | Moist. | Ash | Malt. | AWR | MacM visc. | High ratio 140% sugar layer cake vol., cc. | Angel food cake height, inches |
|---|---|---|---|---|---|---|---|---|---|---|
| Parent stock | 8443 | 11.8 | 7.95 | 12.3 | .295 | 108 | 49.0 | 63 | 2,137 | 3 5/16 |
| Roll reground | 8476 | 11.6 | 7.7 | 11.0 | .278 | 139 | 52.6 | 63 | 2,176 | 3 5/16 |
|  | 8477 | 10.8 | 7.75 | 10.7 | .282 | 173 | 57.0 | 67 | 2,231 | 3 5/16 |
|  | 8463 | 10.7 | 7.73 | 10.4 | .287 | 230 | 63.5 | 67 | 2,176 | (3 5/16) 3 5/16) |
| Turbo reground | 8490 | 11.4 | 8.1 | 10.8 | .275 | 117 | 52.2 | 47 | 2,192 | 3 5/16 |
|  | 8446 | 10.75 | 7.8 | 10.7 | .285 | 129 | 53.8 | 58 | 2,247 | 3 5/16 |
|  | 8574 | 9.8 | 7.4 | 7.9 | .277 | 115 | 60.8 |  | 2,302 | 3 7/16 |

Above data are averages of two runs on the specific testing in question.

Cake baking capacity of parent flour improved only slightly when the medium intense (within the scope of this test) roller mill regrinding procedure has been applied. Compare 140% sugar cake volume produced by XT-8443 parent flour, which is 2137 cc., with the volume of the cake produced by XT-8463, which is 2176 cc. Compare Angel Food cake height of parent flour XT-8443, which is 3 5/16", with the height of Angel Food cake produced by XT-8463, which is 3–3 5/16".

With most intensive roll regrinding within the scope of this test, both the layer and angel food cake baking properties of the same parent stock of flour were substantially inferior to the moderately roll reground flour as well as slightly inferior to the cake baking qualities of the parent flour.

Cake baking properties of parent flour improved significantly more if the most intense (within the scope of this test) regrinding by our process was applied. Compare 140% sugar cake volume produced by parent flour XT-8443, which is 2137 cc., with volume of 140% sugar cake produced by XT-8574, which is 2302 cc. Compare Angel Food cake height produced by parent flour XT-8443, which is 3⁴⁄₁₆″, with height of Angel Food cake produced by XT-8463, which 3⁵⁄₁₆-3⁶⁄₁₆″.

The figures in the tabulation clearly indicate increased cake volumes in the cases of turbo regrinding, and color, texture (by subjective judgement) were improved significantly also.

The McMichael viscosity values prove also the uniqueness of our process. Roll regrinding produced higher viscosity values. Our process lowered the viscosity of the parent flour.

SUMMARY

Above example indicates that regrinding by roller mill procedure does not improve significantly cake baking properties of a flour. If regrinding of a flour is performed by our novel process, significant improvement of cake baking capacity occurs.

*Example No. 5b*

This example is presented to show how extreme regrinding by conventional polished rolls in mills deteriorates cake baking capacity of soft wheat flour and in contrast, how extreme regrinding or disintegration and surface dressing of our novel process improves the cake baking capacity of the same parent soft wheat flour.

A parent short patent flour (XT-8706) milled out of a blend of 85% northern Indiana soft wheat and 15% Michigan white wheat having a protein content of 8.0%, moisture content of 9.85%, ash content of .313%, with a Fisher value of 11.0, maltose value of 94, and AWR of 51.8%, has been reground by polished rolls, ten consecutive times to a Fisher value of 7.4, resulting in an over-ground flour, XT-9603. The same parent flour has been reground by intensive application of our process (turbo grinding) once to a Fisher value of 9.45 (XT-9930) and with the same intensive turbo grinding procedure twice to a Fisher value of 8.7 (XT-9931).

140% sugar layer cakes and angel food cakes were baked under optimum conditions from all of the reground flour stock produced and from the parent soft wheat flour before regrinding.

The following tabulation compares cakes baked of the four flour samples:

(b) Simultaneous production in early stages of a sizable, very high protein fraction.

(1) A commercially milled soft wheat parent flour (XT-7104) milled from a blend of 85% northern Indiana soft wheat and 15% Michigan white wheat, having a protein content of 7.8%, ash content of .325% with a Fisher value of 11.55, Maltose value of 82 and AWR of 47.4%, Bulk Density .521, pH 5.64 has been processed as follows:

First stage air separation performed at critical cut of approximately 17.5 FD unit produced a coarse fraction (XT-7109) representing 91% of the parent stock, having a protein content of 6.4%, ash content of .305% with a Fisher value of 13.75, Bulk Density .606, pH 5.84. Fine fraction (XT-7110) produced by the same separation, representing 9% of the parent stock, had a protein content of 22.4%, ash content of .496% with a Fisher value of 3.6, Maltose value of 157, and AWR 89.2%, Bulk Density .291.

(2) First stage coarse fraction has been primarily reground by "turbo" grinding procedure from 13.75 Fisher value to a Fisher value of 11.63 (XT-7119), Bulk Density .550, pH 5.83.

(3) This primarily reground stock has been submitted to second stage air separation at a critical cut of approximately 17 FD unit, producing a second coarse fraction (XT-7139) representing 80.6% of the parent stock, having a protein content of 5.23%, ash content of .299% with a Fisher value of 14.15, Maltose value of 76, and AWR of 52.1%, Bulk Density .683, pH 5.82. The same second stage air separation produced a fine fraction (XT-7140) representing 10% of the parent stock, having a protein content of 22.6%, ash content of .476%, with a Fisher value of 3.65, Maltose value of 160 and AWR of 98%, Bulk Density .325, pH 5.71.

Note: From the foregoing, it will be noted that the two fine fractions obtained, if blended, amount to 19% of the weight of the total parent stock and have an unusually high protein content of at least 22.53%, as calculated. Such product is of substantial value in enriching other flours for bread making and constitutes a premium product.

(4) The second stage coarse fraction has been submitted to a third stage air separation at critical cut of approximately 24.5 FD unit producing a coarse fraction (XT-7146) and (XT-7152) representing 65.7% of the parent stock, having a protein content of 4.28%, ash content of .289% with a Fisher value of 16.9, Maltose value of 70, and AWR of 51.9, Bulk Density .761, pH 5.82. Third stage fine fraction (XT-7147) and (XT-7153) representing 14.9% of the parent stock, having protein content of 10.32%, ash content of .384%, with a Fisher value of 7.0, Maltose value of 133, and AWR of 91.4%, Bulk Density .450, pH 5.66.

| XT No. | Fisher | Prot. | Moist. | Ash | Malt | AWR | Vol. of 140% sugar cake, ccm. | Ht. of angel food cake, inches | Order of preference, score on 140% sugar loaf cake |
|---|---|---|---|---|---|---|---|---|---|
| 8706, parent soft wheat flour | 11.0 | 8.0 | 9.85 | .313 | 94 | 51.8 | 2,140 | 3⁴⁄₁₆-3⁵⁄₁₆ | 3 |
| 9603, parent polished rolls reground | 7.4 | 8.0 | 6.75 | .313 | 600 | 68.2 | 1,887 | 2¹⁵⁄₁₆-2¹⁵⁄₁₆ | 4 |
| 9930, parent turbo reground | 9.45 | 7.6 | 6.3 | .311 | 105 | 53.7 | 2,224 | 3⁷⁄₁₆ | 2 |
| 9931, parent turbo reground | 8.7 | 7.55 | 5.1 | .310 | 102 | 61.1 | 2,318 | 3⁹⁄₁₆ | 1 |

As tabulation and records show, volume, grain, color suffered by intense polished roll regrinding; volume, grain and color improved by intense turbo-regrinding.

*Example 6*

This example shows:

(a) Production of extremely low protein flours desirable for use in cake making and other specific batter-dough bake products.

(5) The third stage coarse fraction has been secondarily reground by our novel grinding steps from 16.9 Fisher value to 16.0 Fisher value (XT-7158), pH 5.74.

(6) Product of the second regrinding step has been submitted to the fourth step of air separation at critical cut of approximately 21 FD unit producing a coarse fraction (XT-7167) representing 62.2% of parent stock, having a protein content of 3.8%, ash content of .287%, with a Fisher value of 16.2, Maltose value of 73, and AWR of 51.9%, Bulk Density .773, pH 5.69. The fine fraction of the same (fourth stage) air separation (XT-7168) representing 3.5% of parent stock, had a protein content of 16.5%, ash content of .585%, with a Fisher value of 4.6, Maltose value of 256 and AWR of 103.27%, Bulk Density .398.

(7) The coarse fraction of the fourth stage air separation has been submitted to the fifth stage air separation performed at critical cut of approximately 31 FD unit producing a coarse fraction (XT-7173) representing 53.7% of parent stock having a protein content of 3.7%, ash content of .272%, with a Fisher value of 19.2, Maltose value of 69, and AWR of 53.5%, Bulk Density .777, pH 5.50. The fine fraction of the same (fifth stage) air separation (XT-7174) representing 8.5% of parent stock had a protein content of 6.56%, ash content of .342%, with a Fisher value of 9.55, Maltose value of 116, Bulk Density of .555, pH 5.81.

(8) The coarse fraction of the fifth stage air separation has been submitted to a sixth stage air separation performed at critical cut of approximately 38 FD unit producing a coarse fraction (XT-7183) representing 36.5% of parent stock, having a protein content of 4.36%, ash content of .289%, with a Fisher value of 18.65, Maltose value of 67, and AWR of 48.9%, Bulk Density .848, pH 5.52. The fine fraction of the same (sixth stage) air separation (XT-7184) representing 17.2% of parent stock, had a protein content of 2.6%, ash content of .257%, with a Fisher value of 15.3, Maltose value of 81 and AWR of 57.4%, Bulk Density .754, pH 5.57.

(9) The sixth stage coarse fraction has been submitted to a seventh stage air separation performed at critical cut of approximately 42 FD unit producing a coarse fraction (XT-7253) representing 18.9% of parent stock, having a protein content of 5.5%, ash content of .287% with a Fisher value of 20.4, Maltose value of 61 and AWR of 45.1%, Bulk Density .835, pH 5.49.

To compare fraction of extremely low protein content to commercially available wheat starch (i.e., dry processed wheat starch versus wet processed wheat starch) test bakes have been run on cakes where respectively 20, 40 and 50% of conventional soft wheat parent flour have been substituted by our novel dry processed wheat starch and by conventional wet processed wheat starch.

The fine fraction of the same (seventh stage) air separation (XT-7254) representing 17.6% of parent stock had protein content of 2.12%, ash content of .343%, with a Fisher value of 18.0, Maltose value of 63 and AWR 56%, Bulk Density .805, pH 5.42.

SUMMARY

Turbo-regrinding and subsequently applied sub-sieve size air separation has repeatedly in progressive steps produced flours with extremely low protein content. Data indicated that such a flour fraction had similar properties to that of wet processed (unmodified) wheat starch commercially available on the market.

Examples 7a and 7b

The following Examples 7a and 7b are presented to show the materially improved ability of our novel process to obtain substantial protein shifting in the combination of our endosperm disintegrating and critical air separation steps as contrasted with air separation alone of the same parent flour stock commercially roller milled. Reference is made to FIGS. 14 and 15 of the drawings which are flow sheets diagrammatically showing the subject matter of Examples 7a and 7b respectively.

(7) *Protein shifting possibilities with air separation alone.*—(1) A parent A grade flour commercially milled out of straight Montana spring wheat (XT-7886) having a protein content of 14.15%, moisture content of 13.0%, ash content of .410%, with a Fisher value of 23.1, Maltose value of 267 and AWR of 80.6%, Bulk Density of .613, pH 5.72, has been submitted to a first stage sub-sieve size air separation performed at a critical cut of approximately 32 FD unit producing a coarse fraction (XT-7899) representing 93% of parent flour, having a protein content of 13.6%, moisture content of 12.6%, ash content of .408% with a Fisher value of 21.3, Maltose value of 247 and AWR of 68.3%, Bulk Density .665, pH 5.78. The same first stage air separation produced a fine fraction (XT-7900) representing 7% of parent flour, having a protein content of 19.8%, moisture content of 10.2%, ash content of .647%, with a Fisher value of 4.5, Maltose value of 566, and AWR of 67.5%, Bulk Density .256, pH 5.67.

(2) The first stage coarse fraction has been submitted to a second stage air separation performed at a critical cut of approximately 35 FD unit producing a coarse fraction (XT-7939) representing 87% of parent flour, having a protein content of 13.7%, moisture content of 11.9%, ash content of .395% with a Fisher value of 21.2, Maltose value of 249, and AWR of 66%, Bulk Density .693, pH 5.77. Same second stage air separation produced a fine fraction (XT-7940) representing 6% of parent flour, having a protein content of 17.9%, moisture content of 8.6%, ash content of .612% with a Fisher value of 5.0, Maltose value of 600 plus, and AWR of 104.2% and Bulk Density of .291, pH 5.84.

(3) The second stage coarse fraction has been submitted to a third stage air separation performed at a critical cut of approximately 43 FD unit producing a coarse fraction (XT-8046) representing 79% of parent flour, having a protein content of 13.85%, moisture content of 11.3%, ash content of .391%, with a Fisher value of 24.0, Maltose value of 214, and AWR of 64%, Bulk Density .723, pH 5.73. Same third stage air separation produced a fine fraction (XT-8047) representing 8% of parent flour, having a protein content of 10.9%, moisture content of 9.0%, ash content .479% with a Fisher value of 8.55, Maltose value of 562, and AWR of 97.4%, Bulk Density .442, pH 5.89.

(4) The third stage coarse fraction has been sub-

| Parent soft wheat flour, percent | Wet proc. wheat starch, percent | Protein | Ash | Fisher | 140% sugar cake vol. pref. | 115% sugar cake vol. pref. | Angel food | | Score of pref. |
|---|---|---|---|---|---|---|---|---|---|
| | | | | | | | Ht. | Pref. | |
| 100 | ----- | 7.9 | .318 | 11.6 | 2,160 | 2,318 | 3 7/16 | 5 | 1 |
| 80 | 20 | 6.4 | .277 | 12.15 | 2,176 | 2,239 | 3 9/16 | 4 | 2 |
| 60 | 40 | 4.8 | .239 | 12.85 | 2,097 | 2,255 | 3 13/16 | 2 | 3 |
| 50 | 50 | 4.1 | .264 | 13.45 | 2,176 | 2,255 | 3 15/16 | 1 | 4 |
| | Dry proc. wheat starch, percent | | | | | | | | |
| 100 | ----- | 7.9 | .318 | 11.6 | 2,160 | 2,318 | 3 7/16 | --- | --- |
| 80 | 20 | 6.8 | .296 | 12.4 | 2,097 | 2,271 | 3 9/16 | 2 | 3 |
| 60 | 40 | 5.8 | .288 | 13.5 | 2,192 | 2,271 | 3 19/16 | 1 | 2 |
| 50 | 50 | 5.3 | .295 | 13.75 | 2,192 | 2,239 | 3 9/16 | 2 | 1 |
| | 100 | 2.12 | .243 | 18.0 | 2,018 | 2,287 | 4 | 3 | 4 | mitted to a fourth stage air separation performed at a critical cut of approximately 60 FD unit, producing a coarse fraction (XT-8083) representing 70% of parent flour, having a protein content of 14.4%, moisture content of 11.0%, ash content of .378%, with a Fisher value of 25.3, Maltose value of 177, and AWR of 62.9%, Bulk Density .741, pH 5.75. The same fourth stage air separation produced a fine fraction (XT-8084) representing 9% of parent flour, having a protein content of 8.9%, moisture content of 11.0%, ash content of .430%, with a Fisher value of 13.25, Maltose value of 410, AWR of 73.9% and Bulk Density .587, pH 5.91.

(5) The fourth stage coarse fraction has been submitted to a fifth stage air separation performed at a critical cut of approximately 72 FD unit, producing a coarse fraction (XT-8095) representing 61% of parent flour, having a protein content of 14.75%, moisture content of 10.9%, ash content of .361% with a Fisher value of 29.3, Maltose value of 174, and AWR of 63%, Bulk Density .755, pH 5.72. Same fifth stage air separation produced a fine fraction (XT-8096) representing 9% of parent flour, having a protein content of 12.2%, moisture content of 10.7%, ash content of .468% with a Fisher value of 16.8, Maltose value of 333, and AWR of 77.0%, Bulk Density .635, pH 5.98.

(6) The fifth stage coarse fraction has been submitted to a sixth stage air separation performed at a critical cut of approximately 83 FD unit, producing a coarse fraction (XT-8129) representing 53% of parent flour, having a protein content of 14.4%, moisture content of 10.8%, ash content of .371%, with a Fisher value of 28.9, Maltose value of 148, and AWR of 74.4%, Bulk Density .764, pH 5.68. Same sixth stage air separation produced a fine fraction (XT-8130) representing 8% of parent flour, having a protein content of 14.9%, moisture content of 10.9%, ash content of .464%, with a Fisher value of 20.3, Maltose value of 173, AWR of 70.3% and Bulk Density .659, pH 5.84.

Drawing FIGURE 16a presents a diagrammatic illustration of protein distribution in the seven SSS fractions of parent flour produced by the above described fractionation procedure (by air separation alone). Smallest and largest size range fractions have higher protein content than the parent flour, meaning protein matter is concentrated in these fractions. Protein is shifted in positive direction as related to the parent flour. Medium size range fractions have lower protein content than parent flour meaning fractions are depleted in protein matters. Protein is shifted in negative direction as related to parent flour.

Since percentages of the fractions are proportionally illustrated along the abscissa and protein content proportionately illustrated on the ordinate, the shifted areas as illustrated in FIG. 16a are proportionate to the shifting of protein matter into the fractions as related to parent flour. Naturally, the amount of protein matter shifted in positive direction has to be equal to the amount of protein matter shifted in negative direction in case no loss of protein matter occurred during the fractionation procedure, due to imperfections of apparatus and/or procedures utilized.

Amount of protein shifting expressed as the percentage of the total protein matter contained in the parent flour represents an indication of how much protein matter was available to be shifted by sub-sieve size fractionation. This index, in case the parent flour was a commercially milled hard wheat flour, was 12.1% by a real measurement using planimeter.

(7b) *Protein shifting with our improved process (see FIG. 15).*—A parent A grade flour commercially milled out of straight Montana Spring wheat (XT-8511) having a protein content of 14.0%, moisture content of 12.9%, ash content of .414%, with a Fisher value of 20.6, Maltose value of 214, and AWR of 72.4%, Bulk Density .613, pH 5.76 has been submitted to intense regrinding and surface dressing by our novel "Turbo" process, producing a reground parent flour (XT-8512) having a protein content of 14.0%, moisture content of 6.5%, with a Fisher value of 10.3, Maltose value of 331, and AWR of 78%, Bulk Density .543, pH 5.85.

Reground parent flour has been submitted to a first stage SSS air separation performed at a critical cut of approximately 17 FD unit producing a coarse fraction (XT-8520) representing 89% of reground parent flour, having a protein content of 12.5%, moisture content of 6.2%, ash content of .380%, with a Fisher value of 13.1, Maltose value of 305, and AWR of 68.3%, Bulk Density of .603, pH 5.74. Same first stage air separation produced a fine fraction (XT-8521) representing 11% of reground parent flour, having a protein content of 24.2%, moisture content of 5.3%, ash content of .690%, with a Fisher value of 3.65, Maltose value of 475, and AWR of 126.4%, pH 5.96.

The first stage coarse fraction has been submitted to a second stage air separation performed at a critical cut of approximately 28 FD unit, producing a coarse fraction (XT-8548) representing 72% of reground parent flour, having a protein content of 11.8%, moisture content of 6.9%, ash content of .346%, with a Fisher value of 16.8, Maltose value of 257, and AWR of 53.5%, Bulk Density .624, pH 5.73. The same second stage air separation produced a fine fraction (XT-8549) representing 17% of reground parent flour, having a protein content of 14.8%, moisture content of 6.5%, ash content of .481%, with a Fisher value of 6.7, Maltose value of 530, and AWR of 113.5%, Bulk Density .424, pH 5.98.

The second stage coarse fraction has been submitted to a third stage air separation performed at a critical cut of approximately 34 FD unit, producing a coarse fraction (XT-8570) representing 64% of reground parent flour, having a protein content of 12.3%, moisture content of 7.25%, ash content of .353%, with a Fisher value of 16.95, Maltose value of 238, and AWR of 60.3%, Bulk Density .717, pH 5.78. The same third stage air separation produced a fine fraction (XT-8571) representing 8% of reground parent flour, having a protein content of 8.6%, moisture content of 7.3%, ash content of .359%, with a Fisher value of 9.7, Maltose value of 374 and AWR of 80.6%, Bulk Density .567, pH 5.98.

The third stage coarse fraction has been submitted to a fourth stage air separation performed at a critical cut of approximately 43 FD unit producing a coarse fraction (XT-8588) representing 47% of reground parent flour, having a protein content of 13.4%, moisture content of 7.9%, ash content of .346%, with a Fisher value of 18.45, Maltose value of 196, and AWR of 60.3%, Bulk Density .743, pH 5.69. The same fourth stage air separation produced a fine fraction (XT-8589) representing 17% of reground parent flour, having a protein content of 6.9%, moisture content of 8.2%, ash content of .312%, with a Fisher value of 17.4, Maltose value of 213, and AWR of 63.8%, Bulk Density .678, pH 5.92.

The fourth stage coarse fraction has been submitted to a fifth stage air separation performed at a critical cut of approximately 50 FD unit producing a coarse fraction (XT-8601) representing 33% of reground parent flour, having a protein content of 13.7%, moisture content of 7.8%, ash content of .336%, with a Fisher value of 21.8, Maltose value of 156. The same fifth stage air separation produced a fine fraction (XT-8602) representing 14% of reground parent flour, having a protein content of 7.65%, moisture content of 7.9%, ash content of .312% with a Fisher value of 14.2, Maltose value of 172 and AWR of 56.0%, Bulk Density .696, pH 5.87.

The fifth stage coarse fraction has been submitted to a sixth stage air separation performed at a critical cut of approximately 57 FD unit producing a coarse fraction (XT–8605) representing 21% of reground parent flour, having a protein content of 14.6%, moisture content of 7.7%, ash content of .336% with a Fisher value of 22.1, Maltose value of 161, and AWR of 61.2%, Bulk Density .788, pH 5.66. The same sixth air separation produced a fine fraction (XT–8606) representing 12% of reground parent flour having a protein content of 12.9%, moisture content of 7.8%, ash content of .359%, with a Fisher value of 17.0, Maltose value of 224, and AWR of 60.6%, Bulk Density .733, pH 5.78.

In FIG. 16b of the drawings, a diagrammatic showing of protein distribution in the seven sub-sieve size fractions produced after intensive "turbo" regrinding, is presented. Like FIG. 16a, the smallest and largest size range fractions are of higher protein content than the parent flour. Where the combination of steps of regrinding by intensive use of our disintegration and surface dressing steps with several stages of critical air separation has been applied, it will be seen that the protein shifting figure (the addition of negative and positive protein shifting) is increased to 31.8% (FIG. 16b) as contrasted with only 12.1% where the same commercially milled hard wheat flour was used in both instances.

*Example 8*

This example is presented in order to show how our process steps of "turbo" grinding and air classification combined with other commercially known process steps are integrated into a practical, commercial process, producing premium products. Flow sheet of FIG. 17 of the drawings shows the principles of an actual installation.

The mill streams of a parent flour commercially milled out of a blend of 85% Northern Indiana and 15% Michigan white wheats are selected into two stream groups approximating short-patent and first clear flours.

A. In operation, step A, short patent flour is subjected to air separation at a critical cut of 42–48 FD units. Fine fraction to step G.

B. In operation step B, coarse fraction of step A air separation is subjected to another air separation at 42–48 FD unit critical cut. Fine fraction to step G.

C. In operation step C, coarse fraction of step B air separation is subjected to roll regrinding using special roll surface and roll setting.

D. In operation step D, the product of C step rolling operation is subjected to sieve sifting in a rebolting operation by 11XX sifter cloth. Overs to low grade rolls of mill.

E. In operation step E, the throughs of D step, rebolting operation are subjected to intense turbo-grinding.

F. In operation step F, the product of stey E turbo-grinding is subjected to air separation at 45–50 FD unit critical cut. Coarse fraction to step L or M.

G. In operation step G, fine fraction of step F air separation plus fine fractions of step A and B air separations are subjected to air separation at 18–25 FD unit critical cut. The fine fraction of this operation step is part of a commercial premium product; high protein flour or concentrate.

H. In operation step H, first-clear is subjected to air separation at 42–48 FD unit critical cut. Fines to operation step O.

I. In operation step I, coarse fraction of step H air separation is subjected to roll regrinding using special roll surface and roll setting.

J. In operation step J, the product of step I rolling operation is subjected to sieve sifting in a rebolting operation by 11XX sifter cloth. Overs to low grade rolls of the mill.

K. In operation step K, throughs of J step rebolting operation are subjected to intense turbo-grinding.

L. In operation step L, product of step K turbo-grinding or product of step K turbo-grinding plus coarse fraction of step F air separation is/are subjected to air separation at critical cut of 45–50 FD units. Fine fraction goes to O step operation.

M. In operation step M, coarse fraction of step L air separation or coarse fraction of step L air separation plus coarse fraction of step F air separation is/are subjected to roll grinding using special roll surface and roll setting.

N. In operation step N, product of step M (roll grinding) is subjected to intense turbo-grinding.

O. In operation step O, fine fraction of step H air separation plus fine fraction of step L air separation are subjected to further air separation at critical cut of 18–25 FD unit. Fine fraction of this operation step is part of a commercial product; high protein flour or concentrate.

P, Q and R. In operation step P,Q,R, coarse fraction of step G air separation, coarse fraction of step O air separation, and product of step N turbo-grinding are individually subjected to special conditioning operations. After conditioning, the mixture of which is a commercial premium product; improved low protein flour, excellent for production of cakes and certain other baked batter-dough products.

Summarizing the advantages of the operations of the foregoing example and the modification thereof which is hereafter to be described, we obtained in the fine fraction produced after air separation operation G and air separation operation O, a concentrate or flour of very high protein content and a fraction of higher extraction as contrasted with the extraction of protein concentrate product disclosed in our copending application, Serial Number 470,244. This product has a high market value for blending with other flour streams and for other uses, to produce bread dough strength.

The coarse fraction obtained from the steps and procedure of preceding Example 8 and enhanced by the additional treatment specified in the modification to be hereafter described and constituting a blend of the coarse fraction obtained from air separation operation O, air separation operation G and the turbo-grinding operation N is an excellent high premium cake flour (angel food, cookies and the like). The quality of this cake flour is substantially better than the comparable starch concentrate fractions disclosed in our pending application S.N. 470,244 and in a commercial mill, will give an extract or yield of substantially 88% of the total parent flours utilized and oftentimes will have a low protein content below 6% (particularly if the following additional modifications are employed).

As a modification to the embodiment of our process commercially applied as diagrammed in the flow sheet of FIG. 17 and described in the preceding operation steps A to O inclusive, the fines from air separation operations A, B and H of FIG. 17 before efficient air separation in operations G and O are first subjected to rather intense turbo grinding and surface treatment and dressing, thereby shelling out a considerable additional proportion of the finer whole starch granules and producing a substantial addition of the substantially pure protein-matter-particles. This may be accomplished in the flow sheet by conducting both the short patent fine stream from operation A and the first clear fine stream from operation H to a common turbo grinder, the output of which may go to the efficient air separator in operation G at a critical cut of from 18 to 25 FD. The larger coarse fraction from this air separation has a very high concentration of surface treated and dressed starch granules while the fines in the smaller fraction from said air separation (at critical cut of 18 to 25 FD) has a large proportion of discrete protein-matter-particles, such product attaining protein proportions where soft wheat is the parent flour, up to 29%.

The foregoing modification to the operations of example 8 illustrated in FIG. 17 has been in recent months, installed and commercially utilized with high successful results, in a large flour mill, thereby increasing the yield or extract of the previously recited premium products from the original parent stock as contrasted with the products obtained through operations A to O inclusive as diagrammed in FIG. 17.

Example 9

This example shows the hydration characteristics of flours intensely reground by conventional smooth rolls as contrasted with the improved hydration characteristics of flours intensively reground by use of our improved process. The hydration characteristics in each instance are measured by a heat conductivity test and indicated by the actual speed of hydration. Hydration phenomena are described by the variables of time and temperature (heat) with the use of only limited hydrating water.

In this example typical hard and soft wheat parent flours have been selected from the comparative hydration tests. The hard wheat parent flour, XT-8511, was commercially roller milled out of Montana spring wheat. The soft wheat parent flour, XT-8706, was commercially or roller milled from a blend of 85% Northern Indiana soft wheat and 15% Michigan soft white wheat. Both the hard and soft wheat parent flours were individually subjected to intensive or extreme polished roll regrinding procedure, resulting in reground flours identified respectively as XT-9550 and XT-9603.

Same hard and soft wheat parent flours have been individually subjected to intense turbo grinding procedure resulting in reground flours, respectively XT-8512 and XT-9931.

Data of these six test flours are presented in the following tabulation ("AWR" signifies alkaline water retention):

As tabulation shows, intensive polished roll regrinding decreased speed of thermal conductivity within the primitive dough, i.e., thermal conductivity factor $K = B.t.u./(hr.)$ (sq. ft.) (°F/ft.) decreased. Tabulaiton similarly shows that intense turbo grinding procedure on the flour increased speed of thermal conductivity of primitive dough made thereof, i.e., thermal conductivity factor K increased.

Above shifting in thermal conductivity index is at least partly due to some (more or less) additional heat source, which develops within the primitive dough while in heating procedure and which is recognized as being exotherm heat.

The hydration of crystalline starch is instantaneous. If hydrating water has access to larger zones or areas of crystalline starch, more exotherm heat of hydration (secondary heat source) is produced, which in addition to the primary heat supply has been recorded in this example. If hydrating water has to penetrate a more or less water repellent starch granule surface, fewer or more water molecules reach the crystalline starch zones within the interior of the starch granules and less or more heat of hydration is produced. Since the water permeability of starch granules surface is a function of temperature, and also of its surface treatments, physical and chemical condition, etc. by adjusting water permeability of the starch granule surface through our novel surface treating process, hydration properties of a flour along temperature rise or drop can be controlled (for example in the baking oven).

| XT No. | Description | Prot., percent | Moist., percent | Ash | Fisher | Malt. | AWR |
|---|---|---|---|---|---|---|---|
| 8511 | Hard wheat parent | 14.0 | 12.9 | .414 | 20.6 | 214 | 72.4 |
| 9550 | Hard wheat roll regr | 13.9 | 3.5 | .420 | 8.0 | 600+ | 72.1 |
| 8512 | Hard wheat turbo regr | 14.0 | 6.5 | | 10.3 | 331 | 78.0 |
| 8706 | Soft wheat parent | 8.0 | 9.85 | .313 | 11.0 | 94 | 51.8 |
| 9603 | Soft wheat roll regr | 8.0 | 6.75 | .313 | 7.4 | 600 | 68.2 |
| 9931 | Soft wheat turbo regr | 7.55 | 5.1 | .310 | 8.7 | 102 | 61.1 |

The foregoing 6 samples have been subjected to a primitive hydration test involving time and temperature variables in limited amount of water as following described.

DESCRIPTION OF SIMPLE HYDRATION TEST

The flour in each instance was hydrated at reasonable constant room temperature with distilled water in relation of 41.7% flour and 58.3% water on a dry basis. Dough was mixed by a low speed mixer for six minutes. Within the following two minutes, 600 gram dough was placed into a stainless steel receiver cup, and was subjected to high vibration shaking for one minute. After nine minutes from the addition of water to the flour, the stainless steel receiver cup containing the primitive dough was placed in a water bath of constant temperature (boiling), representing a primary heat source.

A thermometer with a minimum on one square centimeter bulb surface was placed in the center of the cup containing the primitive dough, whereby the temperature difference between the thermometer bulb and the primary heat source was secured uniformly. The temperature was recorded in time and plotted. The following tabulation presents the required time for the center of the primitive dough to reach 40, 50, 60, and 70 centigrades:

| XT No. | Description | Time required to reach (minutes) | | | |
|---|---|---|---|---|---|
| | | 40° C. | 50° C. | 60° C. | 70° C. |
| 8511 | Hard wheat parent flour | 14 | 19.3 | 25 | 32.5 |
| 9550 | Hard wheat flour roll regr | 14.7 | 21.2 | 28.5 | 39.5 |
| 8512 | Hard wheat turbo regr | 13.2 | 17.5 | 22.5 | 30.1 |
| 8706 | Soft wheat parent flour | 14 | 20.2 | 27.7 | 36.6 |
| 9603 | Soft wheat flour roll regr | 16.0 | 24.0 | 33.8 | [1] 50 |
| 9931 | Soft wheat flour turbo regr | 12.0 | 18.5 | 25.2 | 33.9 |

[1] By extrapolation.

Example 10 (refer to FIGS. 18 and 19 of the drawing)

This example shows how regrinding of commercial flour through the novel disintegrating and surface treating steps of our process increases the hydration characteristics of the flour. In this example the hydration phenomena are described and measured by the amount of water retained after hydration in excess of the water and by the temperature variable.

A parent flour (XT-8511) commercially milled out of hard Montana spring wheat having a protein content of 14.0%, moisture content of 12,9%, ash content of .414%, with a Fisher value of 20.6 and maltose value of 214, was selected for hydration tests.

The above parent flour was reground by intensive turbo grinding procedure producing a reground flour (XT-8512) having a protein content of 14.0%, moisture content of 6.5%, with a Fisher value of 10.3, and maltose value of 331.

Tests were run on the above flours to measure hydration characteristics by water imbibition (Alkaline Water Retention Test as Specified in the Cereal Chemistry, vol. 30, No. 3, May 1953). Above testing method specified room temperature at which hydration phenomena of flour occur in excess of water. Instead of running tests at room temperature level, five different temperature levels (30°, 40°, 50°, 55°, and 60° C.) were selected. At 70° C. temperature level, imbibition capacity reached such high values that no excess of alkaline water was left in the tube to be drained. Flour hydrations were performed at the above five temperature levels provided by constant temperature water bath.

The following tabulation shows how water imbibition or water withholding capacity of the two flour samples changed at different temperature levels:

| XT No. | Fisher | Maltose | Percent alkaline water retention at ° C. temperature levels ||||||
|---|---|---|---|---|---|---|---|---|
| | | | 30 | 40 | 50 | 55 | 60 | 70 |
| XT-8511 | 20.6 | 214 | 70.7 | 73.7 | 80.4 | 90.8 | 116.3 | 500+ |
| XT-8512 | 10.3 | 331 | 76.8 | 79.9 | 89.8 | 102.2 | 130.5 | 500+ |

Sample relation is plotted on patent FIGURE 18a, that is, alkaline water retention versus temperature level of hydration. Graph on FIGURE 18 of the drawings shows higher values of alkaline water retention capacity in case the flour has been reground by turbo grinding procedure.

FIG. 19 shows the changing rate of alkaline water retention capacity as a function of the temperature. This changing rate is derived from alkaline water retention versus temperature curve and interpreted as the change in alkaline water retention by temperature unit. Graph is presented on semi-logarithmic paper having temperature on the linear scale, and changing rate of alkaline water retention on the logarithmic scale.

Changing rate of alkaline water retention capacity in excess of water has higher values along the temperature scale in case of flours which have been reground by "turbo-grinding" procedure, than in the original flour. This means that at constant temperature level, "turbo" reground flour is able to withhold more alkaline water if hydration occurs in excess of water than does flour which has not been reground. Hydration of elementary flour particles proceeded in greater degree in case of "turbo" reground sample than in case of roller milled sample.

SUMMARY

As possible explanations, the following reasonings are offered:

Regrinding by our novel grinding and surface dressing procedure produced higher specific surface resulting in—

(a) Larger free starch granule surface,
(b) Larger free interior (crystallin) starch surface, and
(c) Higher free protein matter surface for easy access of water to the total flour surface through which water penetration has to forego during hydration.

Examples 1, 6, 7a, 7b, and 8 previously set forth refer to "protein-shifting" performed by our novel reducing and surface treatment steps in combination with sub-sieve size air separation steps. When applicants make use of the expression "protein shifting" it is understood that from a parent cereal flour, products are manufactured which have substantially different NN/N proportion than parent cereal flour. NN/N is the proportion of substances not contributing to nitrogen content of flour to the substances contributing to the nitrogen content of flour within one sample. Actual figures are derived from protein content as being measured according to standard method as set forth in Cereal Laboratory Methods previously referred to.

In case a flour has 8% protein content (N×5.7 i.e. 1.41×5.7) on 14% moisture basis, it has

100−8−14=78% substances not contributing to nitrogen content of the sample. The same sample is considered to have 8% substances contributing to nitrogen content of the sample. NN/N proportion of the flour by weight will be 78/8=9.75.

Our broad experiments show that while commercial methods of flour milling may be able to manufacture products with NN/N proportion range of 12.6 to 6.35, the combination of our novel turbo-grinding procedure with our SSS air separation steps will manufacture (commercially) products with significantly larger NN/N proportion range of 39.6–2.8.

The foregoing data was obtained from comparison of processes made with identical soft wheat flour.

Referring to our Examples 7a and 7b NN/N proportion range can indicate benefit of our turbo-grinding procedure before SSS air separation. Without turbo-grinding SSS air separation manufactured hard wheat flour products with NN/N proportion range of 8.66–3.34. With previous turbo-grinding and the same SSS air separation yielded products with a significantly larger NN/N proportion range of 11.5–2.56. (See drawings, FIGS. 16a and 16b.)

It is to be understood that our novel products and concentrates, both the high protein-matter concentrate and the dressed-starch-granule products for cake baking comprise particles in each instance well within the sub-sieve size range. In the case of the protein-matter concentrates which furnish high bread-dough strength for blending, the particles are all within the lower range of sub-sieve size and, expressed in Fisher values, are preferably within a range of 2½ to 7 by Fisher.

The products having enhanced baking qualities for cakes and other batter-dough products and comprising a very substantial proportion of whole discrete surface treated starch granules lie in the medial zone of sub-sieve size within a range expressed by Fisher values of from 7 to 15, depending on the nature and morphology of the particular cereal endosperm.

It is, of course, impossible to make any accurate comparison of the upper limits of sub-sieve size range (the test sieve of 325 meshes to the linear inch) with flow dynamic characteristics of endosperm or other particles expressed in FD units which, as previously stated, is our standard of measurement which comprehends the three factors of shape, size and density. We can, however, point out that the average maximum sized particles which pass freely through the said test sieve mesh have a maximum dimension slightly in excess of 38 microns (linearly) and have flow dynamic characteristics on the average as expressed in FD units within a range of 71 and 82. It will be understood that, to define the ranges of critical cut in the air separation steps of our overall process within the requirement of the patent law, the factors of shape, size and density and their relationship must be measured. Consequently, our FD system of unit measurement for the fluid dynamic characteristicis is essential, but reference to sub-sieve size is also thought desirable in the appended claims and in the description of the method and product.

*Centrifuge Sedimentation Method for Particle Size Distribution in "Flow-Dynamic Units"*

INTRODUCTION

The method described herein is used for the determination of a particular fluid-dynamic property or characteristic of a test sample representing a material consisting of small particles. The property or characteristic to be measured is a function of three factors: (1) shape, (2) density, and (3) size. The numerical results cannot be unequivocally expressed in known units of measurement such as definite units of length (while the physical dimension of this characteristic is length) and, therefore, the result is expressed in terms of units which are arbitrarily referred to as "flow-dynamic" units. These units correspond only in a general way with what is regarded as the effective diameter of the particle expressed in physical units of length such as microns. We do not attempt to measure directly "effective diameter" or "effective size." The use of this expression would imply a measurement of particles which are spherical or of identical shape but with different sizes. Wheat or other cereal flour particles have a wide diversity of shapes ranging from substantially spherical to particles having most irregular surfaces. The resistance of a particle to fluid-dynamic flow will be the result of shape and size. The third particle characteristic, i.e., density, influences the magnitude of the propelling force. The purpose of the method herein described is the differentiation and comparison of the fluid-dynamic property of particles moving in a liquid medium and the numerical expression of this property.

This method is an adaptation of known methods which have heretofore been employed for the measurement of particle "size." In the known methods, the term "size" is expressed in units of length, and this value is intended to describe average linear diameter of an abstract, imaginary particle which is spherical, and by some parameter which is equivalent to other particles of quite different shapes. In the present method, an assumption is made regarding the average shape of the particles in the calculation of the numerical figures representing the fluid-dynamic properties of the particles being examined. This assumption as to the average shape of the particles is introduced into the formula only as a practical aid in obtaining numerical results which very broadly approximate the average linear diameter of the particle in the fine sifter size range as observed under the microscope. As indicated before, the linear diameter is not a useful index when methods are employed for studying particles which vary tremendously in shape within any given samples and especially when the observer is concerned only with how the particles will behave when propelled through a fluid by gravity or centrifugal force.

It is conceivable that two particles having different shapes, sizes, and densities may move the same distance in the same time through a given fluid medium when the balance of moving force to the resistance is the same. The purpose of this method is to characterize these particles not in terms of shape or size or density, but by a numerical value based on the velocity with which the particles move through a given fluid under the influence of a force. The force of gravity alone was relied upon to move the particles by a method devised by K. T. Whitby and published in Bulletin No. 32 by the University of Minnesota (1950). An apparatus and method employing centrifugal force for the smaller particles was invented by Whitby and is disclosed and claimed in his copending application, Serial No. 329,411, filed January 2, 1953, and assigned to Pillsbury Mills, Inc.

These methods take into account the fact that for very small particles, the viscous resistance of a fluid such as benzene is very great in comparison with the weight of a particle. Thus, in the case of a small particle moving downwardly under the influence of gravity, a speed is soon reached known as the "terminal velocity" at which the retarding force of viscous resistance is equal to the weight of the particle.

In the simple case of falling spherical particles, the following equation applies and represents Stokes law:

$$6\pi R v \eta = \frac{4}{3}\pi R^3 (\rho - \rho_1) g$$

$R$ = radius of the sphere, centimeters
$v$ = terminal velocity, centimeters per second
$\eta$ = the coefficient of viscosity of the medium in which the sphere is falling; poise, grams per centimeter per second.
$\rho$ = density of the particle, g./cm.$^3$
$\pi$ = density of the medium in which the sphere is falling, g./cm.$^3$
$g$ = acceleration of gravity, gravitational constant, 980 cm./sec.$^2$ Solving for terminal velocity we find:

$$v = \frac{2}{9} \frac{gR^2(\rho - \rho_1)}{\eta}$$

In the case of wheat flour particles, it is meaningless to use the term "radius," and, therefore, we substitute the "flow-dynamic" measuring unit F–D, which corresponds to what diameter is (2R) in the Stokes law equation. Hence:

$$v = \frac{1}{18} g \, (\text{F–D})^2 \frac{(\rho - \rho_1)}{\eta} \frac{1}{10^8} \quad (1)$$

where $10^8$ is introduced to convert the dimension of F–D from centimeters to microns.

To determine the flow-dynamic properties of a sample of material we utilize a method to be described in detail below, which is based on the above equation.

Gravity sedimentation in a liquid is employed to determine the percentage of particles having an F–D value of 0.0040 cm. or larger. If a known distance is chosen and velocity expressed as $$\frac{h}{t}$$

the equation takes on the following form:

$$v = \frac{h}{t} = \frac{1 g (\rho - \rho_1)(\text{F–D})^2}{18 \times 10^8 \eta} \quad (2)$$

It is evident that there are only two variables, $t$ and F–D. If, a time, $t$, is chosen, the size that falls a known distance, $h$, can be determined by solving the equation for F–D.

After the particles having an F–D value over 0.0040 cm. have settled out by gravity, centrifugal force is applied to accelerate the settling rate of the smaller particles remaining in the sedimentation liquid.

In the centrifuge sedimentation part of this procedure, a modified form of the above formula is used. The gravitational constant, $g$, is replaced by the centrifugal acceleration which is $r\omega^2$ where $r$ is the variable radial distance between the rotational center and the location of the particle in the tube, $\omega$ is the angular velocity of the centrifuge and is a constant. Substituting in the above equation, the following is obtained:

$$v = \frac{dr}{dt} = \frac{1 r \omega^2 (\text{F–D})^2 (\rho - \rho_1)}{18 \times 10^8 \eta}$$

Separating the variables:

$$dt = \frac{18 \times 10^8 \eta}{\omega^2 (\text{F–D})^2 (\rho - \rho_1)} \frac{dr}{r} = K \frac{dr}{r}$$

where $K$ represents all the constants.
Integrating:

$$\int_0^t dt = K \int_{r_1}^{r_2} \frac{dr}{r} = K \ln \frac{r_2}{r_1}$$

Rearranging:

$$t = \frac{18 \times 10^8 \eta}{\omega^2 (\text{F–D})^2 (\rho - \rho_1)} \ln \frac{r_2}{r_1} \quad (3)$$

If the time is chosen, the characteristic of the particle that travels a known distance can be determined by solving the equation for F–D.

The distance from the center of rotation to the top of the sedimentation liquid is $r_1$, and $r_2$ is the radius measured from the center of rotation to the bottom of the centrifuge tube generally.

In practice, the centrifuge portion is started after some settling has taken place by gravity. A correction has to be applied since the small particles have settled some already. This has been done by correcting the time by the factor equivalent to the distance a particular particle has fallen measured in time.

There are different ways of taking this into consideration, one of which is to determine the position of the particle at the start of the centrifuge step and establish the $r_1$ not to the top of the sedimentation liquid but at the position of the particle in the tube.

These two methods do result in differences in the first particle sizes measured by centrifuge, but the differences decrease as the particles measured become smaller.

HISTORY

The sedimentation method for particle size distribution was studied in the 1948–1949 research of K. T. Whitby of the University of Minnesota under the sponsorship of the Miller's National Federation. This work is published in Bulletin No. 32 of the University of Minnesota, 1950 (1).

The outcome of this work was the adaptation of a Direct Weight Sedimentation Apparatus for use on flour mill stocks. This apparatus was used in Minneapolis Quality Control, Pillsbury Mills, Inc., in 1949–1950. Due to failure in attempts to overcome the objection to its cumbersome operation, it was abandoned in favor of the centrifuge technique which is still the standard test procedure in Pillsbury Milling Development. The Centrifuge Sedimentation Method started in June, 1951.

The basic mathematics, physics, and assumptions are built on those published in the Whitby reference No. 1. The use of a shape factor parameter was carried over into the new Centrifuge Sedimentation Method with the modification that the assumed parameter (the Andreason's shape factor $—S_k=1.612$) is utilized only for the 40 flow-dynamic units and larger size particles. The sedimentation time of the 20–10–5 F–D unit size particles is computed with a shape factor of 1.0.

APPARATUS NECESSARY

The following apparatus should be available for the performance of this test:

(1) One special centrifuge with two speeds, 600 and 1200 r.p.m. A description of such a centrifuge is available in Ref. No. 2, FIG. 1.

(2) One tube holder to permit reading during the gravity sedimentation portion of the test run. A mechanical tapper may be a part, or may not be a part of this tube holder.

(3) Centrifuge tubes as described in Ref. No. 2, FIG. 3.

(4) A dispersing chamber, also described in Ref. No. 2, FIGS. 4 and 5.

(5) Cleaning wire, brush, and powder to scoop. The powder scoop has a large and small pocket especially adjusted to measure approximately the correct volume of material directly into the dispersing chamber, approximately 25 mg. and 10 mg. respectively. These amounts of test material fill the capillary on the bottom of the centrifuge tube to a final sedimentation height of 10 to 20 mm.

(6) Centrifuge sedimentation tables. Special time schedule tables are prepared for each material of known density (flour—1.44 gr./cc) requiring a certain optimum sedimentation liquid of known viscosity and density.

(7) Appropriate sedimentation liquid with the viscosity and density known to 1% or better accuracy. Benzene is one of the best sedimentation liquids available for flour mill products, such as wheat flour, and is used in this sedimentation test. Benzene has a specific gravity of 0.8715, and a viscosity of 0.00582 poise at 80° F.

(8) Dispersion liquid. The specific gravity of the dispersion liquid should be at least 0.05 less than the specific gravity of the sedimentation liquid. A mixture of 75% benzene and 25% naptha gasoline produces the best dispersing liquid for use with benzene as sedimentation fluid. By maintaining a specific gravity difference of 0.05 between the dispersing liquid and the sedimentation liquid, the intermixing of the two liquids is prevented and the dispersing liquid can be floated on the surface of the sedimentation liquid, and thus an even distribution of the particles of the sample on the surface of the sedimentation liquid can be assured.

(9) Stop watch and holder. An ordinary 60 second sweep stop watch is satisfactory.

(10) Storage and dispensing containers for the sedimentation and dispersing liquids. An automatic pipette can be used to dispense the sedimentation liquid. Another convenient way to transfer the dispersing liquid to the dispersing chamber is by use of a medicine dropper.

(11) Data sheets.

METHOD OF OPERATION

The test is normally carried out in the following manner:

A centrifuge tube is first cleaned with the sedimentation liquid to be used. It is very important that no particles stick to the walls of the tube to disturb subsequent sedimentation tests. The cleaning wire and brush should be used after every test with benzene as the cleaning fluid.

The properly cleaned tube is then filled to within 6–7 mm. of the top with the sedimentation liquid and then placed in the tube holder.

The flour is dispersed directly into the chamber which is small enough to cap with the finger tips. The screened end is considered the bottom. The following is the general method of starting the sedimentation:

(1) Place two level scoopfulls (small end) of flour into the chamber.

(2) Add 0.8 ml. (approximately) of dispersion liquid.

(3) Shake vigorously for 30 seconds, stop and release pressure.

(4) Cap the top with a finger and remove finger from bottom.

(5) Place chamber on the tube, release finger and start stop watch.

(6) Remove chamber with a twisting motion. This will leave a sharp layer of dispersion liquid.

If a tapping device is used, it should be started and the readings of the sedimentation height on the bottom of the capillary are made according to the time schedule. If no mechanical tapping device is available, satisfactory results can be obtained by hand tapping with a light metal rod.

The particles settle through the sedimentation liquid in accordance with the principles of Stokes' law and the coarser particles will settle more rapidly than the finer ones. The settling time of the coarser particles with only the force of gravity acting upon them is relatively short, and therefore particles down to approximately 40 flow-dynamic units in size are allowed to settle without applying the centrifuge. When the gravity settling period has been completed, the tube is placed in the centrifuge. The weight of the full sedimentation tube is counterbalanced on the other side of the centrifuge arm by a similar sedimentation tube with liquid. The centrifuge is run at the specified speed according to the time schedule presented below. It is stopped at time intervals to make readings of the material height in the capillary bottom of the sedimentation tube. To determine the end point where all particles have settled, a speed and time are chosen which will completely clarify the suspension.

TABLE I

*Time Table Schedule for Gravity Sedimentation*

| Flow-dynamic units | Chosen shape factor parameter | Col. ht. reading time, seconds | Col. ht. reading time, min. and sec. |
|---|---|---|---|
| 200 | 1.612 | 12.4 | |
| 180 | 1.612 | 15.9 | |
| 160 | 1.612 | 19.3 | |
| 140 | 1.612 | 25.5 | |
| 120 | 1.612 | 34.4 | |
| 100 | 1.612 | 49.5 | |
| 80 | 1.612 | 77.1 | 1:17.1 |
| 60 | 1.612 | 137.0 | 2:17.0 |
| 50 | 1.612 | 198.0 | 3:18.0 |
| 40 | 1.612 | 309.0 | 5:09.0 |

The reading times for the chosen units in Table I were computed from a modification of Formula 2. The modified formula, including the shape factor parameter, is as follows:

$$(F-D)^2 = \frac{18 \times 10^3 \eta h}{(\rho - \rho_1) g t}(S_k)^2$$

Solving the equation for time ($t$):

$$t = \frac{18 \times 10^3 \eta h}{(\rho - \rho_1) g \ (F-D)^2}(S_k)^2 \qquad (4)$$

For our test the factors in this formula are:

$t$ = time in seconds
$\eta$ = 0.00582 viscosity of benzene in poise on 80° F., a constant.
$h$ = 10 cm., the height of the sedimentation liquid in the tube, a constant.
$\rho$ = 1.440 gr./cm.$^3$ the average specific gravity of flour, an assumed constant here.
$\rho_1$ = 0.8715 gr./cm.$^3$ the specific gravity of benzene at 80° F., a constant.
$g$ = 980 cm./sec.$^2$, a constant.
F–D = flow-dynamic units of size, microns.
$S_k$ = 1.612 shape factor parameter.

The above formula is a mathematical definition of flow-dynamic units.

The reading time schedule, Table II, for the centrifuge sedimentation part of the test is derived from Equation 3. After the introduction of the shape factor parameter here, the centrifuge sedimentation time for a certain flow-dynamic unit is:

$$T_y = \frac{18 \times 10^8 \eta}{(\rho - \rho_1)\omega^2 (F-D)^2} \frac{1 n r_2}{r_1} (S_k)^2 \quad (5)$$

$S_k$ = 1.0 shape factor, parameter
$r_1$ = 3.4 cm.
$r_2$ = 13.4 cm.

One short way to apply this formula to the organization of the time table schedule is explained in detail here. While the gravity sedimentation time schedule readings are calculated from the beginning of the sedimentation, this centrifuge sedimentation time schedule is figured in centrifuge running time from the beginning of centrifuge sedimentation. The above formula figures the centrifuge time from the first beginning of the sedimentation (same as gravity sedimentation formula), therefore, the basic formula is adjusted in the following manner:

$$T_y = \frac{18 \times 10^8 \eta}{(\rho - \rho_1)\omega^2 (F-D)^2} \frac{1 n r_2}{r_1} \frac{(t_y - t_{40})}{(t_y)}$$

Where $t_{40}$ means gravity sedimentation time in seconds of the 40 F–D size particle, $t_y$ is the gravity sedimentation time of a chosen F–D size particle smaller than 40 F–D.

After the calculation of the centrifuge times for the chosen sizes, only two adjustments must be made for practical use:

(1) Adjust centrifuge times to compensate for readings taken at larger units (time clock settings). Note Table II where 10 units requires 61 seconds but in practice 12.2 seconds is used for 20 units so only an additional 48.8 seconds is required in going from 20 to 10 units.

(2) Correction to compensate for starting (acceleration) and stopping (deacceleration) of the centrifuge. This must be applied to each interval to be observed.

TABLE II

*Time Table Schedule for the Centrifuge Sedimentation*

| Fow-dynamic units | Chosen shape factor | Col. ht. reading time, seconds uncorrected, 600 r.p.m. | Time clock setting intervals for each test run, uncorrected seconds | Time clock setting for each test run (corrected +5.2 seconds [1]) |
|---|---|---|---|---|
| 20 | 1.0 | 12.2 | 12.2 | 17.4 |
| 10 | 1.0 | 61.0 | 48.8 | 54.0 |
| 5 | 1.0 | 256.0 | 195.0 | 200.2 |
| 0 | | | | ([2]) |

[1] The correction is necessary to compensate for the errors introduced by acceleration and deacceleration periods in the test runs.
[2] 5 min. 1,200 r.p.m.

Observe that the height of the column of particles which have collected in the capillary narrowed bottom of the sedimentation tube is directly proportional to the volume of the particles settled. Therefore, by taking readings at the time intervals listed in the above table and by noting the height of the column in the capillary, we have determined the relative particle size distributions. In the following table, we illustrate a typical particle size distribution data sheet.

TABLE III

| Flow-dynamic Units | Settling time, min. sec. | Observed col. ht., mm. | Difference col. ht., mm. | Percent in particle size range | Percent finer than size |
|---|---|---|---|---|---|
| 160 | 19.3 | 0.0 | | | 100.0 |
| 140 | 25.5 | 0.4 | 0.4 | 2.3 | 97.3 |
| 120 | 34.7 | 3.0 | 2.6 | 14.7 | 83.0 |
| 100 | 49.5 | 6.9 | 3.9 | 22.0 | 61.0 |
| 80 | 1:17 | 9.9 | 3.0 | 17.0 | 44.0 |
| 60 | 2:17 | 12.2 | 2.3 | 13.0 | 31.0 |
| 40 | 5:10 | 15.2 | 3.0 | 16.9 | 14.1 |
| 20, 600 r.p.m. | 17.5 | 16.9 | 1.7 | 9.6 | 4.5 |
| 10, 600 r.p.m. | 54.0 | 17.4 | 0.5 | 2.8 | 1.7 |
| 0, 1,200 r.p.m. | 5:0 | 17.7 | 0.3 | 1.7 | |
| | | | | 100.0 | |

A plot is made on semi-logarithmic, three-cycle paper using flow-dynamic units as the abscissa and percent finer-than-size as the ordinate. The abscissa should be on the three cycle logarithmic side.

LIST OF REFERENCES (1) K. T. Whitby, Determination of Particle Size Distribution, Apparatus and Technique for Flour Mill Dust. Bulletin No. 32, University of Minnesota.

(2) K. T. Whitby, Methods and Apparatus for Determining Particle Size Distribution of Finely Divided Materials. Patent application, Serial No. 329,411, filed Jan. 2, 1953.

What we claim is:

1. In a commercial flour milling process for treating a cereal flour selected from the group consisting of wheat, barley, corn and rye comprising the steps of subjecting said cereal flour to a "turbo" grinding step to shell out whole starch granules and to simultaneously comminute the more friable protein substances into discrete fine protein shreds, and subjecting at least a portion of said cereal flour to an air current and fractionating said flour by suspending a fine fraction in one stream of said current and a coarse fraction in another stream of said current, said fine fraction comprising mainly sub-sieve size particles consisting of free protein material and relatively small starch granules and having a protein content higher than that of the original said cereal flour, and said coarse fraction comprising mainly large starch granules and agglomerates and having its protein content reduced relative to the original said cereal flour.

2. The commercial flour milling process of producing two flour fractions from the heterogeneous cereal endosperm particles selected from the group of cereals consisting of wheat, barley, corn and rye wherein said fractions are more particularly adapted to specified end uses than the endosperm particles from which derived, which process comprises the steps of setting up within a treatment chamber turbulent air currents contacting and impinging against spaced elements having opposing frictional surfaces, continuously introducing into said turbulent air currents comminuted endosperm particles containing a major percentage by weight of agglomerates of starch granules and protein matter, whereby said particles are actuated by the movements and turbulent air currents to produce individual spinning of the particles and movement thereof through a multiplicity of generally circuitous travels, striking and rubbing against said frictional surfaces often obliquely and often rubbing against other spinning particles in said circuitous paths to shell-out and release whole starch granules of all sizes from said agglomerate particles and to simultaneously rub off and disintegrate the more friable protein substances to fine particles below the upper measurement of sub-sieve size, then pneumatically classifying the resultant particles to suspend and remove the sub-sieve size protein-substance particles thereby obtaining a fine fraction adapted for specified end uses having a protein content significantly higher than said original endosperm particles, and to collect and remove the greater part of the discrete whole starch granules thereby obtaining a second fraction more particularly adapted to a specific end use where low protein and high starch content is desired.

3. The commercial flour milling process of producing two wheat flour fractions more particularly adapted to specified end uses than the flour from which derived, which comprises the steps of setting up within a chamber defined by adjacent wall surfaces, high velocity movements of air through a multiplicity and variety of generally circuitous paths which include a number of curved travels against and along said wall surfaces, continuously introducing into said movements of air commercially milled wheat flour containing a large percentage by weight of agglomerates of starch granules and protein matter and small percentages by weight of free starch granules and discrete sub-sieve size protein particles, whereby said particles are actuated by the movements and circuitous travels of said gaseous medium individually spinning and moving through a multiplicity of general circuitous travels and striking and rubbing against said wall surfaces often at oblique angles to shell-out and release whole starch granules of all sizes from said agglomerate particles and to simultaneously strip off and disintegrate the more friable protein substances to fine particles below the upper measurement of sub-sieve size, then pneumatically classifying the resultant particles at a critical cut to suspend and remove the sub-sieve size particles having flow dynamic characteristics below 25 F-D units to thereby obtain a fine fraction having a protein content greater than the original flour from which derived and pneumatically classifying said reground particles to collect and remove the greater part of the discrete whole starch granules having flow dynamic characteristics within the range of from about 25 to 40 F-D units.

4. The commercial flour milling process of obtaining a protein-rich fraction from cereal endosperm particles selected from the group consisting of wheat, rye, corn and barley and from which bran and germ had been previously substantially removed, which comprises the steps of subjecting said particles in a high velocity flow of air within a chamber defined by wall surfaces including spaced impact surfaces, arranged to produce variable high velocity movement of the particles through a multiplicity of curves and circuitous paths, which movement causes the particles to spin and to recurrently strike against said impact surfaces and against each other at oblique angles to shell out whole starch granules and to simultaneously comminute the more friable protein substances into discrete fine protein shreds, and then air separating by suspension and removal from said mass of particles, a very fine fraction of sub-sieve size containing substantially all of said fine protein shreds, said fraction having a protein content greater than that of the original endosperm particles and in excess of 16½%.

5. The process as set forth in previous claim 4 wherein said air separating step is carried out at a cut approximating 20 F-D units.

6. The commercial flour milling process of producing two flour fractions from milled endosperm flour particles selected from the group consisting of wheat, rye, corn and barley and from which bran and germ have been previously substantially removed, which comprises the steps of setting up within a grinding-treatment-chamber, high velocity continuous flow of air and with said chamber defined by wall surfaces including spaced impact surfaces arranged in correlation with said air flow to produce spinning and variable high velocity movement of the particles through a multiplicity of curved paths, introducing said milled particles continuously into said flow of air whereby the particles repeatedly strike obliquely against said impact surfaces and against each other to shell out whole starch granules from the particles and to simultaneously dislodge and comminute the more friable protein substances into discrete fine protein shreds, air separating from said ground quantity of particles a very fine fraction having a Fisher value of 7 or less and containing substantially all of said fine protein shreds and having a protein content significantly higher than said original endosperm flour particles, and removing from said ground quantity of particles, a second fraction having flow dynamic characteristics in the upper half of said sub-sieve size and containing substantially all of said discrete starch granules, said last fraction having a protein content lower than a starch content substantally higher than said original endosperm flour stock.

References Cited in the file of this patent

UNITED STATES PATENTS

| | | |
|---|---|---|
| 217,066 | Collins | July 1, 1879 |
| 958,496 | Herendeen | May 17, 1910 |
| 1,154,547 | Smith | Sept. 21, 1915 |
| 1,499,080 | Short | June 24, 1924 |
| 2,191,095 | Hobbie | Feb. 20, 1940 |
| 2,374,407 | Block et al. | Apr. 24, 1945 |
| 2,376,747 | Andrews | May 22, 1945 |
| 2,561,388 | Lykken et al. | July 24, 1951 |
| 2,561,564 | Crites | July 24, 1951 |
| 2,754,211 | Siefker et al. | July 10, 1956 |
| 2,752,097 | Lecher | July 26, 1956 |
| 2,957,632 | Sullivan et al. | Oct. 25, 1960 |

FOREIGN PATENTS

| | | |
|---|---|---|
| 696,799 | Great Britain | Sept. 9, 1953 |

OTHER REFERENCES

"Cereal Chemistry," vol. 24 (1947), pp. 381–393; pp. 381–388 relied on.

"Cereal Chemistry," vol. 25 (1948), pp. 155–167.

"Anderung von Mehleigenschaften durch Windsichtung," by Hanssen et al., German report on the "Internationaler Brotkongress, Hamburg 1955," pp. 154–157 (translation available, 12 pp.).

"Deutsche Müller Zeitung," No. 17, 1952, pp. 417–8.

Disclaimer 3,077,308.—*Tibor A. Rozsa*, Minneapolis, Minn., *Arlin B. Ward*, Springfield, Ill., and *Rezsoe Gracza*, Minneapolis, Minn. PROCESS OF REDUCING AND SURFACE TREATING CEREAL ENDOSPERM PARTICLES AND PRODUCTION OF NEW PRODUCTS THROUGH ATTENDANT SEPARATIONS. Patent dated Feb. 12, 1963. Disclaimer filed Sept. 23, 1964, by the assignee, *The Pillsbury Company*.

Hereby enters this disclaimer to claims 1, 2, 4 and 5 of said patent.

[*Official Gazette December 22, 1964.*]